(12) United States Patent
Masuda et al.

(10) Patent No.: US 7,831,155 B2
(45) Date of Patent: Nov. 9, 2010

(54) OPTICAL TRANSMISSION DEVICE

(75) Inventors: Kouichi Masuda, Osaka (JP); Tomoaki Ohira, Osaka (JP)

(73) Assignee: Panasonic Corporation, Osaka (JP)

( * ) Notice: Subject to any disclaimer, the term of this patent is extended or adjusted under 35 U.S.C. 154(b) by 714 days.

(21) Appl. No.: 11/819,891

(22) Filed: Jun. 29, 2007

(65) Prior Publication Data
US 2008/0002991 A1 Jan. 3, 2008

(30) Foreign Application Priority Data
Jul. 3, 2006 (JP) .............................. 2006-183818

(51) Int. Cl.
H04B 10/04 (2006.01)
G02F 1/03 (2006.01)

(52) U.S. Cl. ................. 398/198; 398/192; 398/186; 359/276; 359/239; 359/249

(58) Field of Classification Search ................ 398/198, 398/192, 194, 195, 188, 186, 187; 359/279, 359/237, 239, 249, 276, 278
See application file for complete search history.

(56) References Cited

U.S. PATENT DOCUMENTS

| | | | | |
|---|---|---|---|---|
| 6,404,535 B1* | 6/2002 | Leight | ......................... | 359/306 |
| 6,583,910 B1* | 6/2003 | Satoh | ......................... | 398/182 |
| 7,224,506 B2* | 5/2007 | Kim et al. | ................... | 359/276 |
| 7,330,667 B2* | 2/2008 | Fells | ......................... | 398/193 |
| 2004/0161249 A1* | 8/2004 | Suda et al. | .................. | 398/198 |
| 2004/0208436 A1* | 10/2004 | Hakimi et al. | ................ | 385/27 |
| 2007/0092266 A1* | 4/2007 | Shimizu et al. | ............. | 398/198 |
| 2007/0110454 A1* | 5/2007 | Maeda et al. | ............... | 398/188 |

FOREIGN PATENT DOCUMENTS

JP 2005-208172 8/2005

OTHER PUBLICATIONS

Graham H. Smith et al., "Overcoming Chromatic-Dispersion Effects in Fiber-Wireless Systems Incorporating External Modulators", IEEE Transactions on Microwave Theory and Techniques, vol. 45, No. 8, pp. 1410-1415, Aug. 1997.

* cited by examiner

Primary Examiner—M. R. Sedigihian
(74) Attorney, Agent, or Firm—Wenderoth, Lind & Ponack, L.L.P.

(57) ABSTRACT

The present invention provides an optical transmission device 100 capable of solving the problem of an unnecessary residual sideband components to thereby obtain a high-quality optical intensity-modulated signal in a case where an SSB optical modulation section 20 has wavelength dependence and a manufacturing error. In the optical transmission device 100, where the SSB optical modulation section 20 cannot evenly branch the intensity of the optical carrier into two routes of optical waveguide, the amplitude adjusting section 62 adjusts the amplitude of an electric signal that changes the refractive index of the SSB optical modulation section 20 so that the unnecessary sideband component of the optical intensity-modulated signal outputted from the SSB optical modulation section 20 disappears.

19 Claims, 22 Drawing Sheets

F I G. 3
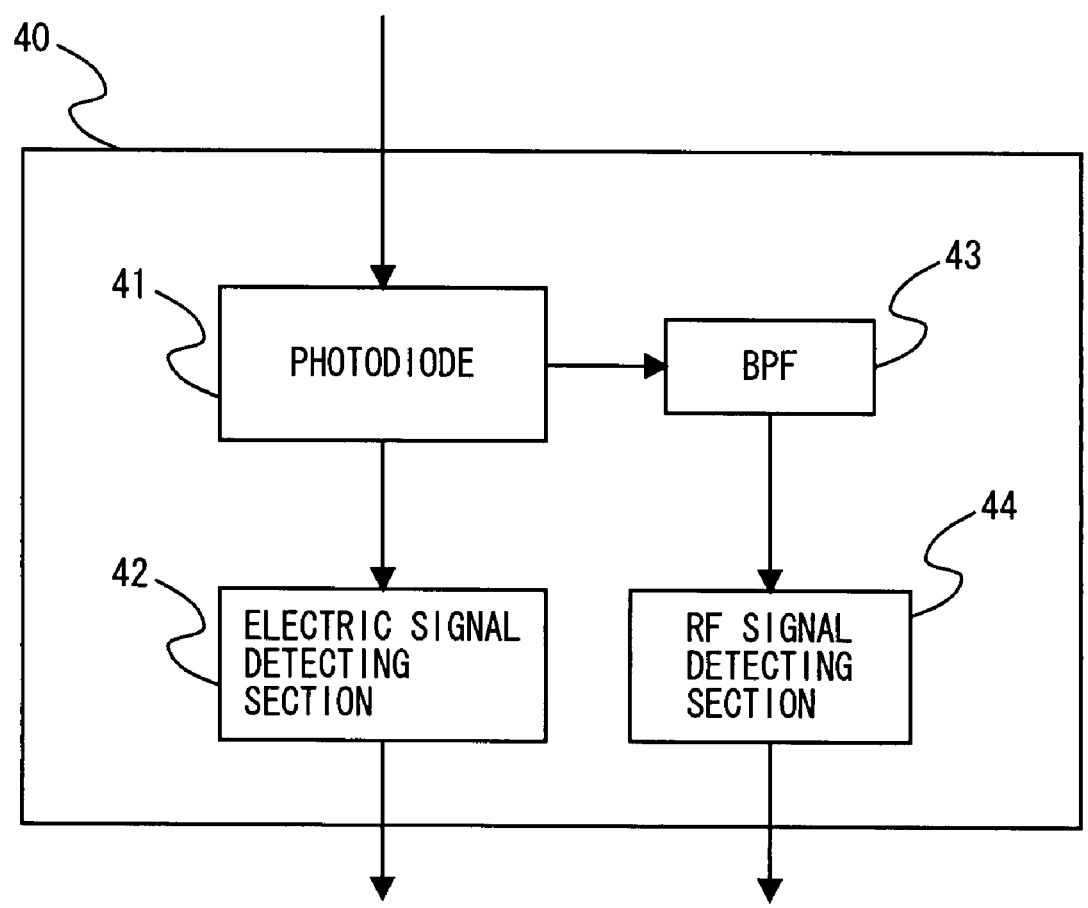

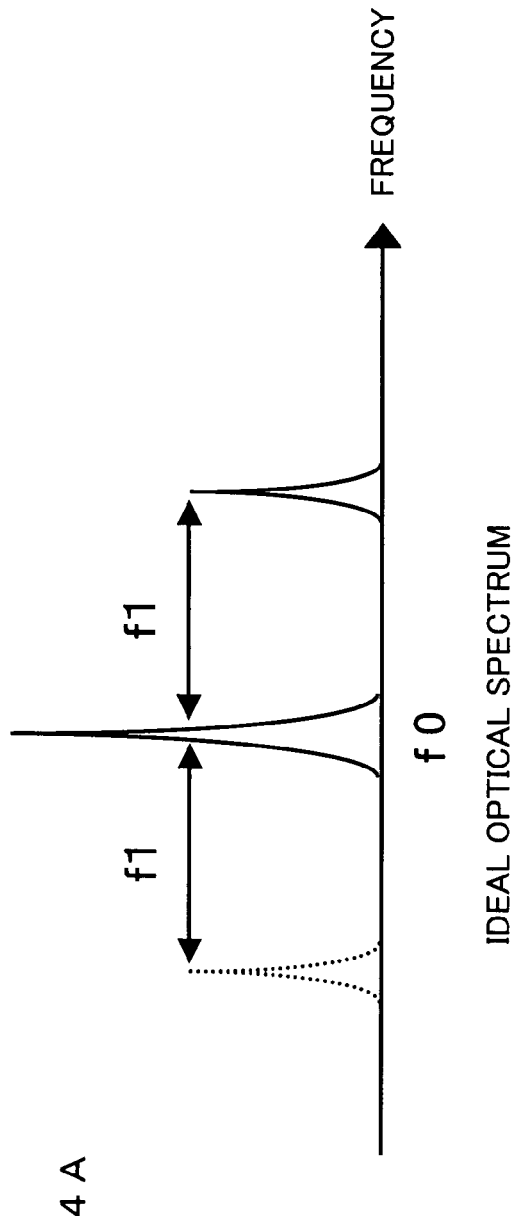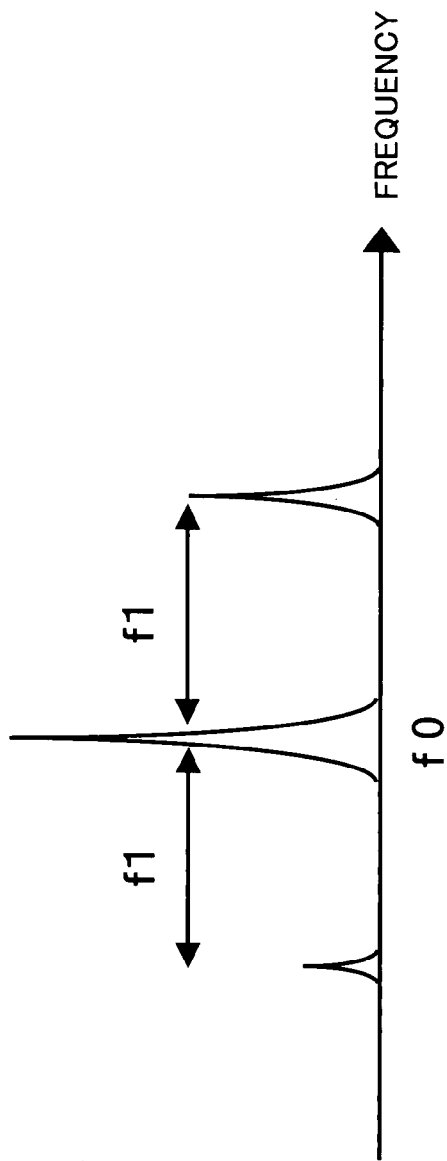

F I G. 5
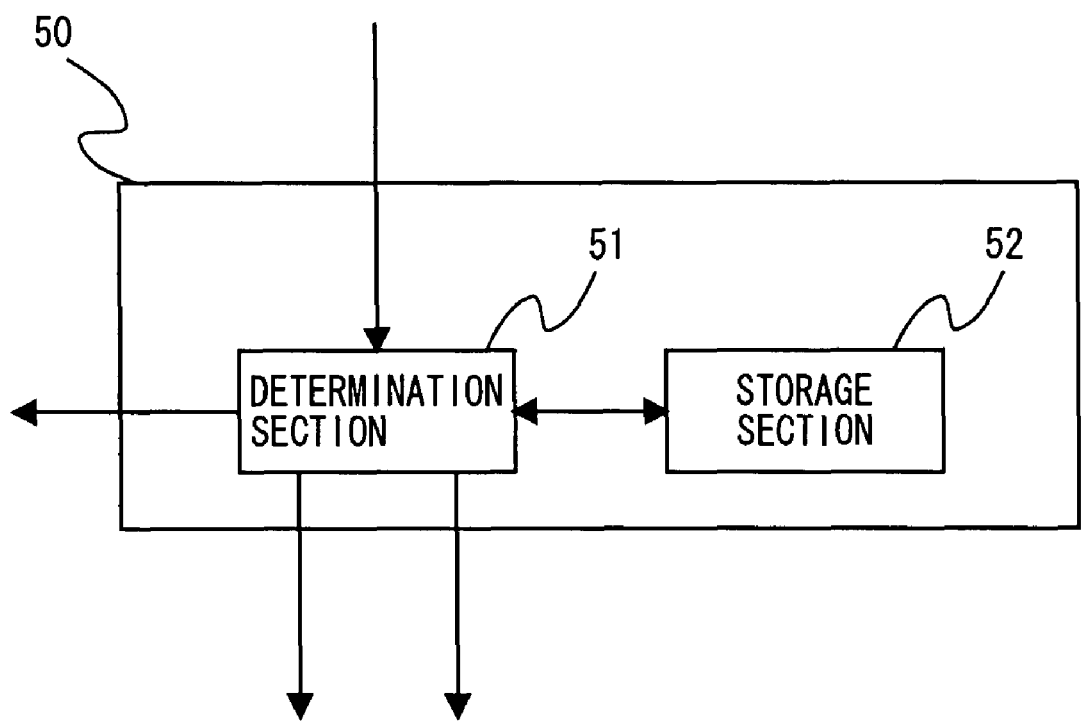

F I G. 6
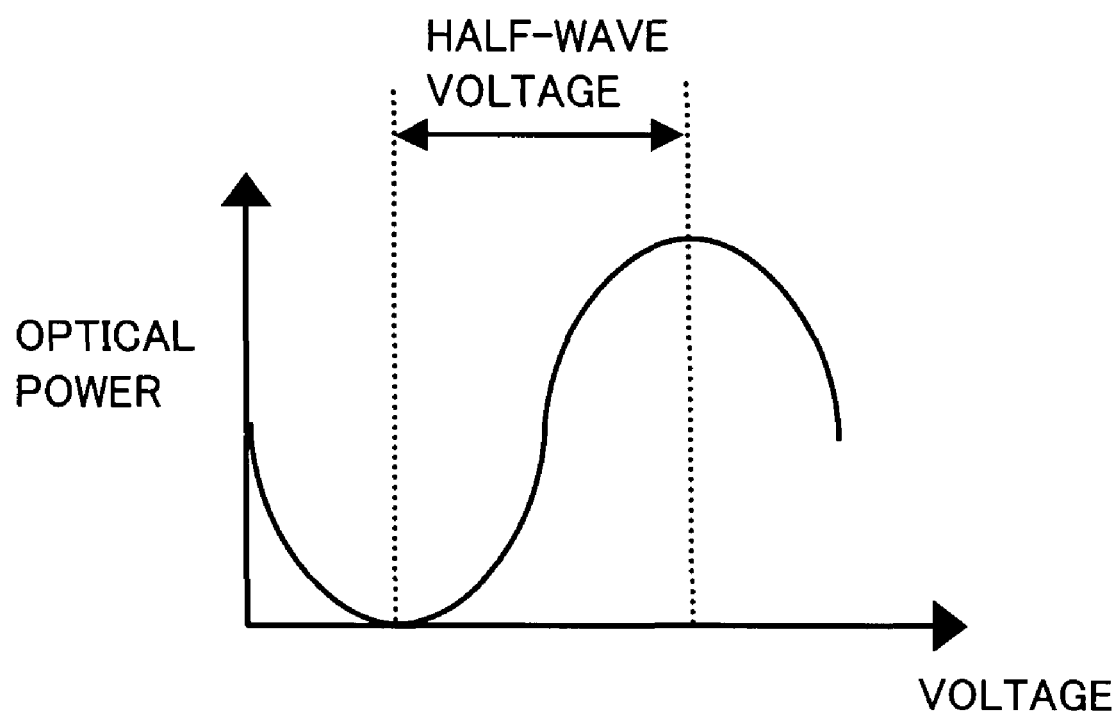

F I G. 8
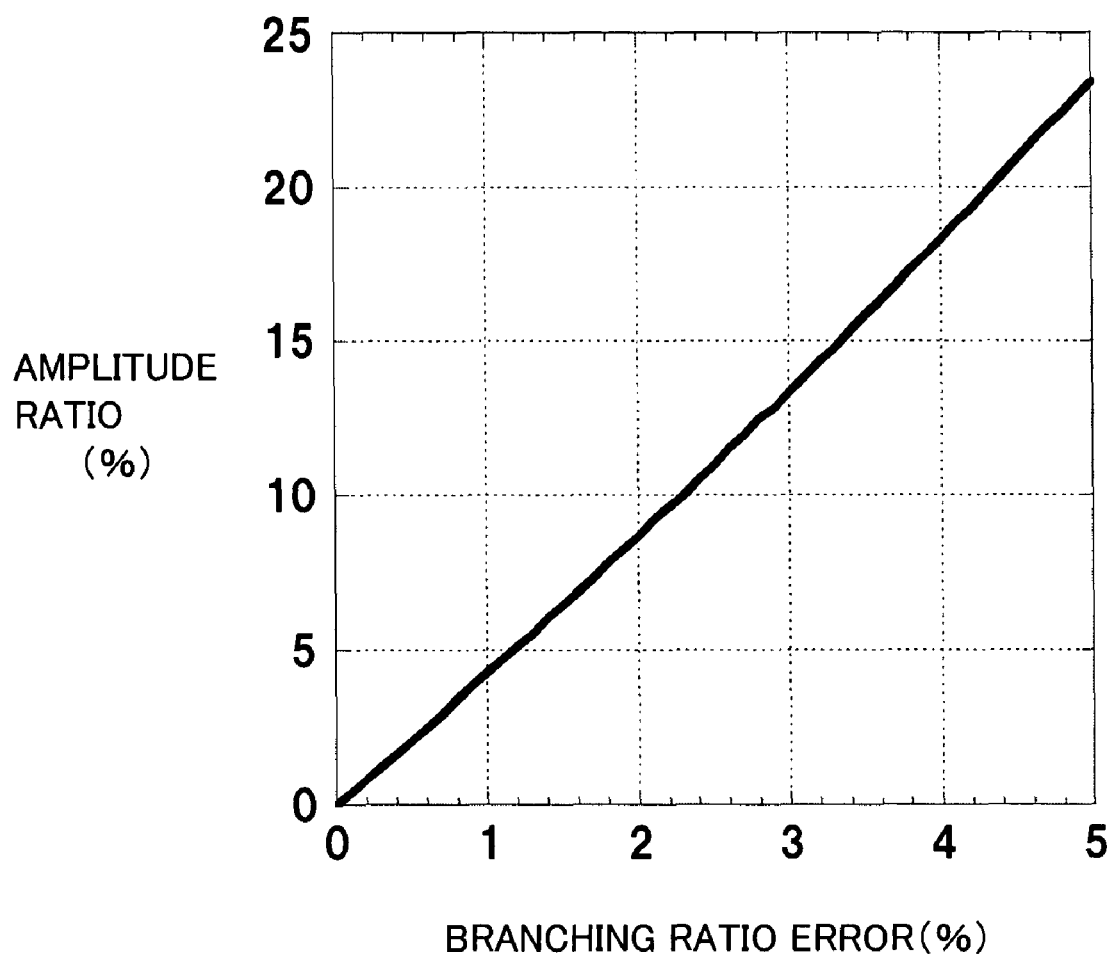

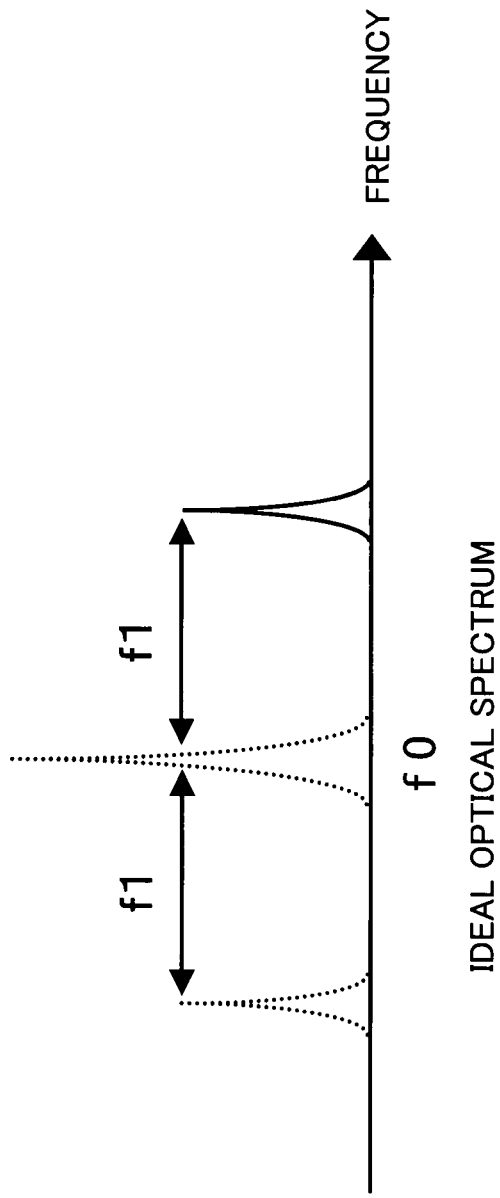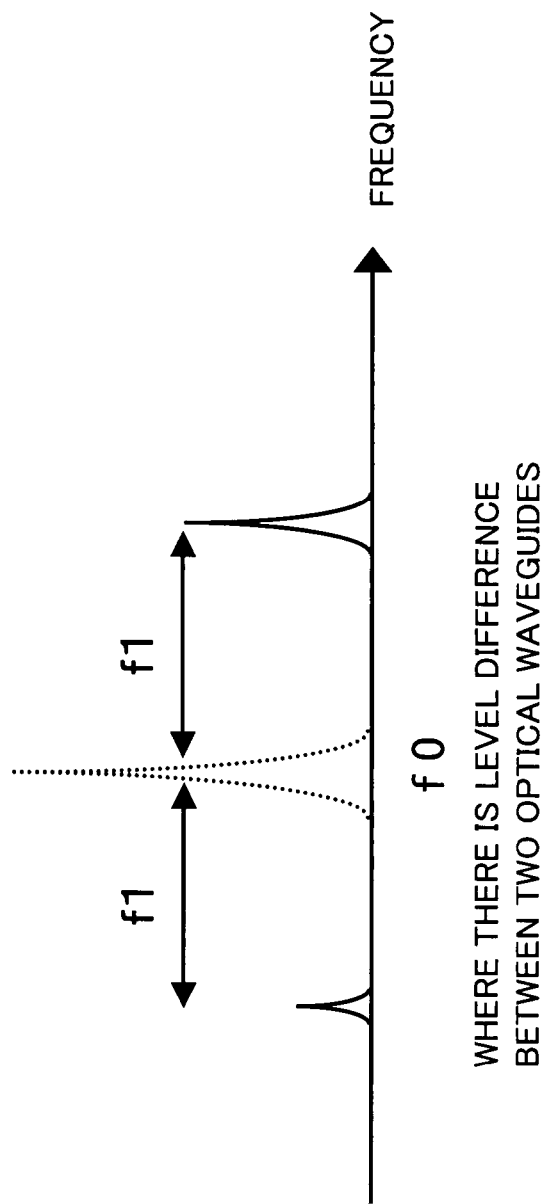

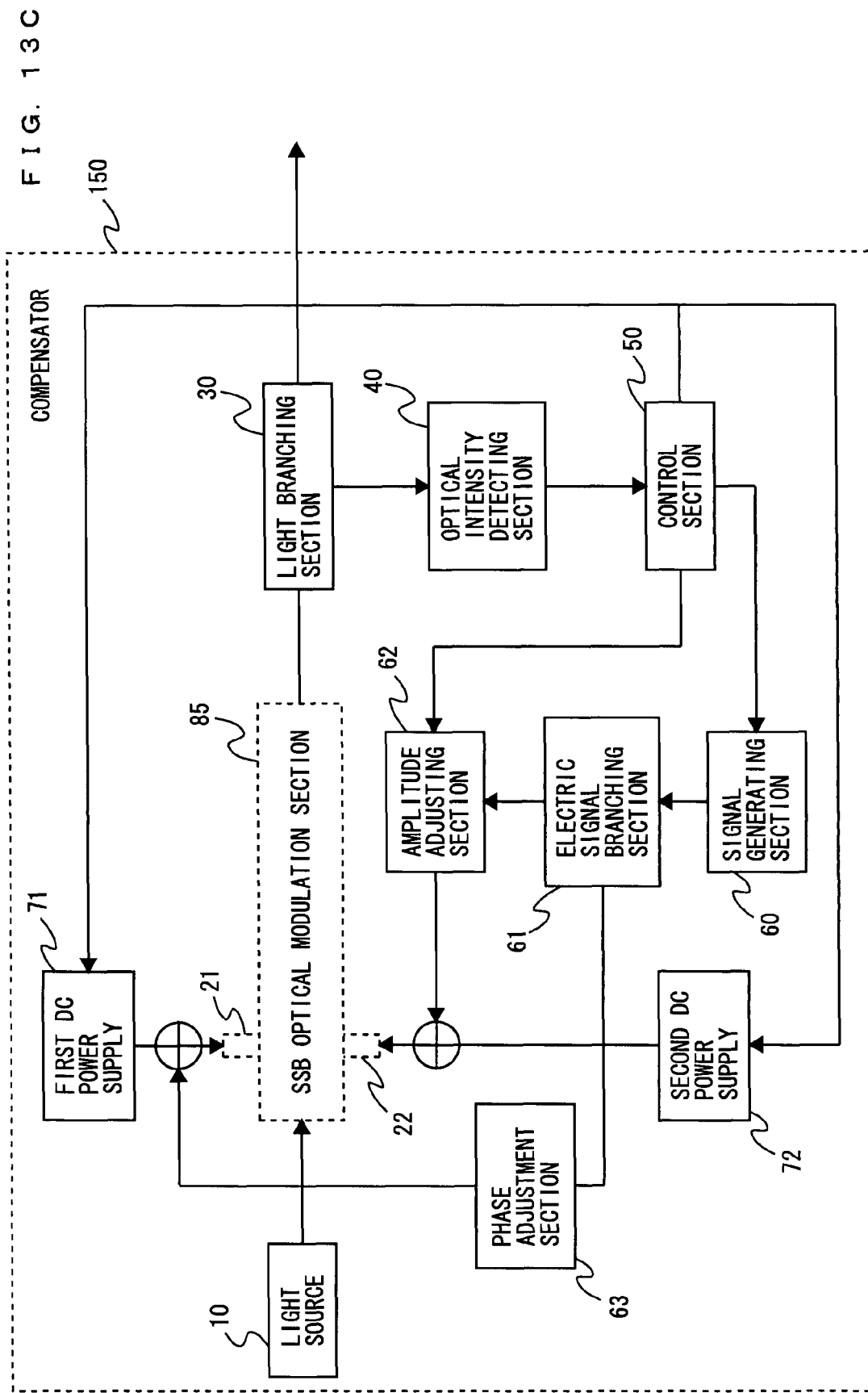

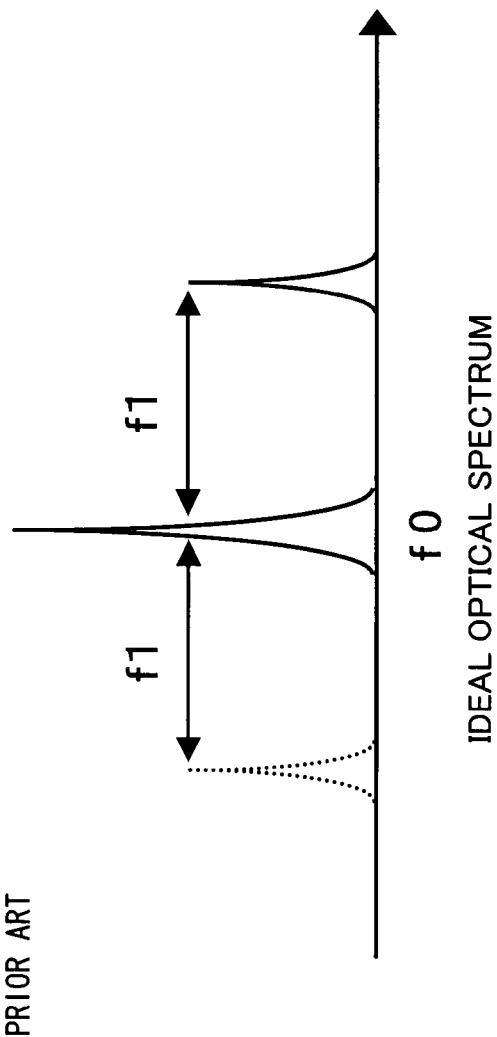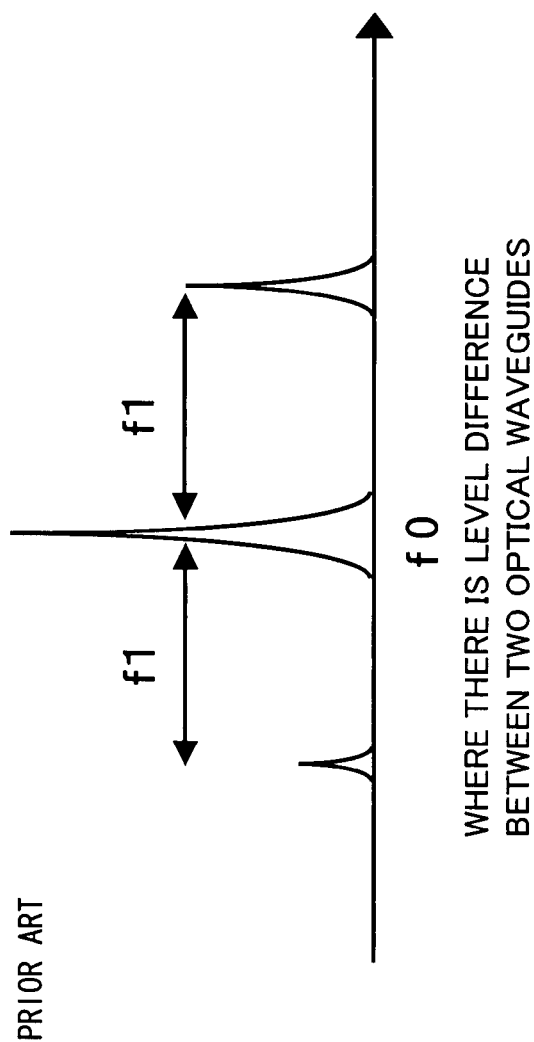
FIG. 18A PRIOR ART — IDEAL OPTICAL SPECTRUM
FIG. 18B PRIOR ART — WHERE THERE IS LEVEL DIFFERENCE BETWEEN TWO OPTICAL WAVEGUIDES

OPTICAL TRANSMISSION DEVICE

BACKGROUND OF THE INVENTION

1. Field of the Invention

The present invention relates to an optical transmission device including a Mach-Zehnder interferometer (hereinafter referred to as an "MZ interferometer"), and more particularly to an optical transmission device capable of solving the problem of unnecessary residual sideband components to thereby obtain a high-quality optical intensity-modulated signal in a case where the optical modulation section for performing a single-sideband modulation (hereinafter referred to as "SSB"), a single-sideband suppressed-optical carrier modulation (hereinafter referred to as "SSB-SC"), etc., has a manufacturing error and wavelength dependence.

2. Description of the Background Art

In a system for realizing wireless communications by using high-frequency signals such as those in the microwave band and the millimeter wave band, it has been seen as a promising method to employ an optical transmission scheme using an optical fiber, which has a wide transmission band and little loss, for exchanging signals between a control station and a base station. Moreover, it is expected that the frequency band for use in wireless communications will transition from the microwave band to the millimeter wave band. Accordingly, there is an increasing demand for optical transmission devices for use in the millimeter wave band.

FIG. 14 is a schematic diagram showing an optical fiber network between a control station and base stations in a system for realizing wireless communications by using high-frequency signals. As shown in FIG. 14, the optical fiber network includes a control station 110 for transmitting an optical signal, an optical fiber 300 for carrying an optical signal, and base stations 200-1, . . . , 200-n for receiving an optical signal and realizing wireless communications with, for example, portable terminals (not shown).

The control station 110 includes an optical transmission device 120. The optical transmission device 120 transmits an optical signal that has been modulated with a high-frequency signal such as a microwave signal or a millimeter wave signal. The transmitted optical signal travels through the optical fiber 300 so as to be photoelectrically converted at a light-receiving section (not shown) of each of the base stations 200-1, . . . , 200-n. The photoelectrically converted signal is transmitted to a portable terminal, or the like, as a wireless signal of a high-frequency band such as the microwave band or the millimeter wave band.

However, where an optical signal having a wavelength of 1.55 μm, for example, is transmitted along a single-mode optical fiber that is for use with an optical signal having a wavelength of 1.31 μm, the transmitted signal periodically attenuates by a certain level over every passage of a particular transmission distance. The attenuation phenomenon occurs as the upper and lower sideband components, which are produced when the optical carrier is intensity-modulated with a high-frequency signal, are influenced by the wavelength dispersion.

FIG. 15 is a diagram showing a frequency spectrum of an optical intensity-modulated signal, which is produced by performing an optical intensity modulation so as to include the optical carrier component, the upper sideband component and the lower sideband component. Where an optical carrier having a frequency $f_0$ is intensity-modulated with a high-frequency signal having a frequency $f_1$, the upper sideband component (frequency $f_0+f_1$) appearing on the higher-frequency side of the optical carrier and the lower sideband component (frequency $f_0-f_1$) appearing on the lower-frequency side of the optical carrier have frequencies that are apart from each other by $2 \times f_1$, i.e., twice the frequency of the modulation signal. The upper sideband component and the lower sideband component at the point where the optically-modulated signal is transmitted each have a predetermined phase shift angle with respect to the carrier component, which are, for example, $+\pi/4$ and $-\pi/4$ (rad), respectively.

However, as the signal transmission distance increases, the phase shift angle changes to periodically become $+\pi/2$ and $-\pi/2$ (rad). At points where the phase shift angle with respect to the carrier component is $+\pi/2$ and $-\pi/2$ (rad), the phase of the upper sideband component is shifted by $\pi$ (rad) from that of the lower sideband component. When an optical intensity-modulated signal is photoelectrically converted by the receiver at such a point, the beat component $f_1$ between the optical carrier and the upper sideband and the beat component $f_1$ between the optical carrier and the lower sideband cancel each other due to interference. As a result, the modulated signal, which has been photoelectrically converted, disappears.

FIG. 16 is a diagram showing the relationship between the received signal power on the optical signal receiving side and the transmission distance. Referring to FIG. 16, the disappearance of the received signal power occurs at regular intervals of a particular transmission distance. This means that the modulated signal, which has been photoelectrically converted, disappears at regular intervals of a particular transmission distance. The particular transmission distance decreases as the frequency of the modulated signal increases. Accordingly, where the modulated signal is a millimeter wave signal, the modulated signal disappears frequently at intervals of a short transmission distance, which substantially hinders the optical transmission.

One possible method to avoid such a hindrance in an optical fiber network as shown in FIG. 14 is such that an optical carrier is intensity-modulated with a microwave signal by the control station 110, and the optical signal is received by the base stations 200-1, . . . , 200-n so that the received optical signal is up-converted to a millimeter wave signal. With such a method, however, it is necessary to provide an up-converter in each of the base stations 200-1, . . . , 200-n. This increases the size and cost of the base stations 200-1, . . . , 200-n, and also makes more difficult the maintenance thereof.

Thus, where the modulated signal is a millimeter wave signal, the disappearance of the modulated signal needs to be avoided without up-converting the signal at the receiver. Therefore, it has been discussed to employ, for example, SSB optical modulation (See Non-Patent Document 1).

Non-Patent Document 1: Graham H. Smith et., IEEE Transactions on Microwave Theory and Techniques, vol. 45, No. 8 p. 1410-1415, August, 1997.

FIG. 17 is a diagram showing a configuration of a conventional optical transmission device disclosed in Non-Patent Document 1. The optical transmission device corresponds to the optical transmission device 120 described above. Referring to FIG. 17, the optical transmission device includes a DFB (distributed feedback) laser 400 for outputting an optical carrier, an isolator 410 for receiving the optical signal from the DFB laser 400, a polarization controller 420 for receiving the optical carrier from the isolator 410, a signal generator 440 for outputting a signal to be transmitted, an amplifier 450 for receiving the signal from the signal generator 440, a branching unit 460 for receiving the signal from the amplifier 450, a phase adjustment section 470 for receiving the signal from the branching unit 460, and an MZ interferometer 430 for receiving the signal from the phase adjustment section 470, the signal from the branching unit 460 and the signal from the polarization controller 420.

The optical carrier outputted from the DFB laser 400 is inputted to the MZ interferometer 430 via the isolator 410 and the polarization controller 420. The isolator 410 is provided for preventing reflected light from entering the DFB laser 400. Typically, the isolator 410 is provided in the DFB laser 400. The polarization controller 420 is for adjusting the plane of polarization of the input light to a plane of polarization that is suitable for intensity modulation.

A high-frequency signal to be transmitted is outputted from the signal generator 440, and is amplified by the amplifier 450 to a predetermined level. The amplified signal is branched into two signals by the branching unit 460. One branch signal is inputted directly to the MZ interferometer 430. The other branch signal passes through the phase adjustment section 470 where the phase thereof is changed by $\pi/2$ (rad). The signal whose phase has been changed is inputted to the MZ interferometer 430.

FIG. 18A is a diagram showing the frequency spectrum of an optical intensity-modulated signal produced through an ideal SSB optical modulation of an optical carrier having a frequency $f_0$ with a modulated signal having a frequency $f_1$. When an optical carrier inputted to the MZ interferometer 430 is branched into two optical waveguides, and the phase of the high-frequency signal to be applied to one optical waveguide and that of the high-frequency signal to be applied to the other optical waveguide are shifted from each other by $\pi/2$ (rad), there is obtained an optical intensity-modulated signal having an upper or lower sideband component in addition to the optical carrier component, as shown in FIG. 18A. Such a method where an SSB optical modulation is performed by using two high-frequency signals (modulated signals) whose phases are different from each other by $\pi/2$ (rad) is known as a phase method.

Where an optical intensity-modulated signal having only the carrier component and one sideband component is transmitted over a long distance via an optical fiber, the beat component cancellation at the receiver does not occur because there is only one, upper or lower, sideband component, whereby the modulated signal, which has been photoelectrically converted, does not disappear. Therefore, by using an SSB optical modulation scheme, it is possible to avoid the influence of signal disappearance due to the wavelength dispersion.

FIG. 19 is a diagram showing a configuration of an ordinary MZ interferometer 430 capable of an SSB optical modulation. The MZ interferometer 430 branches the input light through a branching section 960 provided at the input end into two optical waveguides 940 and 950. A DC (direct current) bias voltage and an RF (radio frequency) signal voltage are applied to the optical waveguides 940 and 950, respectively, and the refractive indexes of the optical waveguides 940 and 950 change according to the voltages. Because of the changes in the refractive indices, the optical carriers passing through the optical waveguides 940 and 950 are each phase-modulated. An optocoupler section 970 provided at the output end of the MZ interferometer 430 combines together the light beams, which have been phase-modulated through the optical waveguides 940 and 950. By this combining, there is produced an optical intensity-modulated signal in which a modulated signal is superposed over an optical carrier.

However, the optical transmittance characteristics of the MZ interferometer 430 have problems of wavelength dependence and a manufacturing error (see, for example, Japanese Laid-Open Patent Publication No. 2005-208172 (hereinafter "Patent Document 1")). Because of the wavelength dependence and the manufacturing error, the SSB characteristics deteriorate. Specifically, while it is ideal that the light branching section 960 of the MZ interferometer 430 evenly branches the carrier into two light beams of the same intensity, the branching ratio will not in practice be 1:1 due to the wavelength dependence and the manufacturing error of the MZ interferometer 430. FIG. 18B is a diagram showing the frequency spectrum of an optical intensity-modulated signal where the light branching ratio of the light branching section 960 is not 1:1 in the MZ interferometer 430 shown in FIG. 19. In an ideal state where the light branching ratio is 1:1, the frequency spectrum of the optical intensity-modulated signal is such that an unnecessary sideband component disappears as shown in FIG. 18A. Where the branching ratio is not 1:1, the frequency spectrum of the optical intensity-modulated signal is such that there is an unnecessary residual sideband component as shown in FIG. 18B.

The modulation operation of the MZ interferometer 430 will now be described below using numerical expressions. The input optical carrier is expressed by Expression (1).

$$E(t) = E \cos \omega_0 t \qquad \text{Expression (1)}$$

The branching ratio of the light branching section 960 is herein denoted as $\gamma$ ($\gamma<1$). The branching ratio $\gamma$ means (the intensity of one of light beams branched into one optical waveguide)/(the intensity of input light to the light branching section). In this case, the photoelectric field of the optical carrier passing through one of the optical waveguides can be represented by $E_A(t)$ in the first line of Expression (2). The photoelectric field of an optical intensity-modulated signal that can be obtained through an optical intensity modulation of the optical carrier can be represented by $E_A(t)$ in the fourth line of Expression (2). Herein, $V_a(t)$ is the RF (radio frequency) signal voltage applied to one optical waveguide, $k_a$ is the amplitude of the RF signal, and $V_A$ is the amount of phase to be given to the optical carrier by the DC bias voltage applied to one optical waveguide.

$$
\begin{aligned}
E_A(t) &= \gamma E \cos \omega_0 t \qquad \text{Expression (2)} \\
V_a(t) &= k_a \cos \omega_1 t \\
V_A &= 0 \\
E_A(t) &= \gamma E \{\cos(\omega_0 t + V_a(t) + V_A)\} \\
&= \gamma E \{\cos(\omega_0 t + k_a \cos \omega_1 t)\} \\
&= \frac{\gamma E}{2} \left[ \begin{array}{l} \cos(\omega_0 t)\cos(k_a \cos \omega_1 t) - \\ \sin(\omega_0 t)\sin(k_a \cos \omega_1 t) \end{array} \right] \\
&= \frac{\gamma E}{2} \left[ \begin{array}{l} \cos(\omega_0 t)\{J_0(k) - \\ 2J_2(k_a)\cos 2\omega_1 t\} - \\ \sin(\omega_0 t)\{2J_1(k_a)\cos \omega_1 t - \\ 2J_3(k_a)\cos 3\omega_1 t\} \end{array} \right]
\end{aligned}
$$

$J_n$ in Expression (2) is an $n^{th}$-order Bessel function. The $J_0(k)$ term represents the optical carrier component, the $J_1(k)$ term the first-order sideband component, the $J_2(k)$ term the second-order sideband component, and the $J_3(k)$ term the third-order sideband component. The following description will focus only on the term of the first-order sideband component $J_1$, and the second-order and subsequent components are ignored. The term of the first-order sideband component $J_1$ can be extracted from the last line of Expression (2) and expressed as shown in Expression (3).

$$J_1 \text{ component} = -\gamma E J_1(k_a)[\sin \omega_0 t \cos \omega_1 t] = -\gamma E J_1(k_a) [\sin(\omega_0+\omega_1)t + \sin(\omega_0-\omega_1)t] \qquad \text{Expression (3)}$$

The photoelectric field of the optical carrier passing through the other optical waveguide can be represented by $E_B(t)$ in the first line of Expression (4). The photoelectric field of an optical intensity-modulated signal that can be obtained through an optical intensity modulation of the optical carrier can be represented by $E_B(t)$ in the fourth line of Expression (4). Herein, $V_b(t)$ is the RF (radio frequency) signal voltage applied to the other optical waveguide, $k_a$ is the amplitude of the RF signal, and $V_B$ is the amount of phase to be given to the optical carrier by the DC bias voltage applied to the other optical waveguide.

$$E_B(t) = (1-\gamma)E\cos\omega_0 t \qquad \text{Expression (4)}$$

$$V_b(t) = k_b \sin\omega_1 t$$

$$V_B = \frac{\pi}{2}$$

$$E_B(t) = (1-\gamma)E\{\cos(\omega_0 t + V_b(t) + V_B)\}$$

$$= (1-\gamma)E\{\cos(\omega_0 t + k_b\sin\omega_1 t + \frac{\pi}{2})\}$$

$$= -\frac{(1-\gamma)}{2}E\begin{bmatrix}\sin(\omega_0 t)\cos(k_b\sin\omega_1 t) + \\ \cos(\omega_0 t)\sin(k_b\sin\omega_1 t)\end{bmatrix}$$

$$= -\frac{(1-\gamma)}{2}E\begin{bmatrix}\sin(\omega_0 t)\{J_0(k_b) + \\ 2J_2(k_b)\cos 2\omega_1 t\} + \\ \cos(\omega_0 t)\{2J_1(k_b)\sin\omega_1 t + \\ 2J_3(k_b)\sin 3\omega_1 t\}\end{bmatrix}$$

$J_n$ in Expression (4) is an $n^{th}$-order Bessel function. The $J_0(k)$ term represents the optical carrier component, the $J_1(k)$ term the first-order sideband component, the $J_2(k)$ term the second-order sideband component, and the $J_3(k)$ term the third-order sideband component. The following description will focus only on the term of the first-order sideband component $J_1$, and the second-order and subsequent components are ignored. The term of the first-order sideband component $J_1$ can be extracted from the last line of Expression (4) and expressed as shown in Expression (5).

$$J_1 \text{component} = \qquad \text{Expression (5)}$$

$$-\frac{(1-\gamma)}{2}E\{2J_1(k_b)\cos(\omega_0 t)\sin\omega_1 t\}$$

$$= -(1-\gamma)EJ_1(k_b)\begin{Bmatrix}\sin(\omega_1 + \omega_0)t + \\ \sin(\omega_1 - \omega_0)t\end{Bmatrix}$$

$$= -(1-\gamma)EJ_1(k_b)\begin{Bmatrix}\sin(\omega_0 + \omega_1)t - \\ \sin(\omega_0 - \omega_1)t\end{Bmatrix}$$

Consider an optical intensity-modulated signal being obtained by combining together an optical phase-modulated signal produced by a phase modulation through one optical waveguide and another optical phase-modulated signal produced by a phase modulation through the other optical waveguide. The sideband component of the optical intensity-modulated signal can be obtained by adding together the sideband $J_1$ component of Expression (3) and the sideband $J_1$ component of Expression (5). In an ideal state where the light branching section 960 has no manufacturing error, or the like, and the light branching section 960 branches the optical carrier with a 1:1 ratio, the branching ratio $\gamma$ will be 1/2. Assuming that $k_a = k_b$, the sum of the sideband $J_1$ component of Expression (3) and the sideband $J_1$ component of Expression (5) is such that the $\sin(\omega_0-\omega_1)t$ terms are canceled out by each other while the $\sin(\omega_0+\omega_1)t$ terms are not canceled out. For example, the $\sin(\omega_0-\omega_1)t$ term and the $\sin(\omega_0+\omega_1)t$ term represent the lower sideband component and the upper sideband component, respectively. Thus, there is obtained an optical intensity-modulated signal having a single sideband component (see FIG. 18A).

On the other hand, where the light branching section 960 has a manufacturing error, or the like, and the light branching section 960 cannot branch the optical carrier with a 1:1 ratio, the branching ratio $\gamma$ will not be 1/2. Even if $k_a = k_b$, the sum of the sideband component $J_1$ of Expression (3) and the sideband component $J_1$ of Expression (5) is such that the $\sin(\omega_0-\omega_1)t$ components are not canceled out by each other. Thus, the unnecessary sideband component does not disappear but remains (see FIG. 18B).

If one sideband component remains, the optically-modulated signal is influenced by the wavelength dispersion as described above while being transmitted through the optical fiber. FIG. 20 is a diagram showing the relationship between the optical waveguide manufacturing error and the degree by which the unnecessary sideband component is suppressed. The horizontal axis represents, as the optical waveguide manufacturing error (waveguide error), the difference between the intensities of light beams inputted to the two optical waveguides divided by the sum of the intensities of the light beams inputted to the two optical waveguides in terms of percentage (%). The vertical axis represents the intensity ratio between the necessary sideband component and the unnecessary sideband component in terms of dB. As can be seen from FIG. 20, a 1% manufacturing error results in a degree of suppression of about 35 dB, and a 2% manufacturing error results in a degree of suppression of about 30 dB. Thus, a small manufacturing error results in a substantial deterioration in the degree of suppression.

Where light is intensity-modulated with a baseband digital signal having a low frequency, an optical intensity modulation such that one sideband component disappears is not typically performed, but an optical intensity modulation with both sideband components is performed. Where one sideband component is not made to disappear, the problem of the unnecessary residual sideband component does not occur.

With an external optical modulation section, there is a phenomenon called "DC drift" where a change in the temperature, or the like, also changes the optimal point of the bias voltage. Conventionally, when an optical intensity modulation is performed with a low-frequency signal, the bias voltage is controlled according to the change in the optimal point to thereby solve the DC drift problem. On the other hand, when an optical intensity modulation is performed with a high-frequency RF signal, both sideband components disappear at short intervals, whereby there is a greater need to perform an SSB optical modulation, or the like, such that one sideband component is made to disappear, as described above. In view of this, one possible way is to perform a bias voltage control to eliminate DC drift in order to solve the problem of a residual sideband component due to the waveguide manufacturing error. However, the problem cannot be addressed sufficiently with a bias voltage control.

SUMMARY OF THE INVENTION

Therefore, an object of the present invention is to solve the problems in the prior art and to provide an optical transmission device capable of solving the problem of an unnecessary residual sideband component, which occurs when an optical modulation section for performing an SSB optical modulation, an SSB-SC optical modulation, or the like, using a high-frequency signal cannot evenly separate two routes of optical carrier from each other, thereby realizing a high-quality optical intensity-modulated signal.

The present invention is directed to an optical transmission device. In order to achieve the object set forth above, an optical transmission device of the present invention includes: a light source for outputting an optical carrier; a signal generating section for outputting an electric signal; an electric signal branching section for branching the electric signal outputted from the signal generating section into two electric signals having a predetermined phase difference therebetween; an amplitude adjusting section for receiving at least one of the two electric signals outputted from the electric signal branching section and adjusting an amplitude of the received electric signal; and an optical modulation section with suppressed sideband component, including an optical waveguide branching into two routes of optical waveguide at an input end and merging together at an output end, for outputting an optical intensity-modulated signal from the output end. If both of the two electric signals are inputted to the amplitude adjusting section, the optical modulation section modulates optical carriers passing through the two routes of optical waveguide with two amplitude-adjusted electric signals inputted via the amplitude adjusting section, and if one of the two electric signals is inputted to the amplitude adjusting section, the optical modulation section modulates optical carriers passing through the two routes of optical waveguide with an amplitude-adjusted electric signal inputted via the amplitude adjusting section and an amplitude-unadjusted electric signal inputted from the electric signal branching section without passing through the amplitude adjusting section. If the optical modulation section cannot evenly branch an intensity of the optical carrier into the two routes of optical waveguide, the amplitude adjusting section adjusts an amplitude of the received electric signal so that an unnecessary sideband component of the optical intensity-modulated signal outputted from the optical modulation section disappears.

The optical transmission device may further include: a light branching section for branching an optical signal outputted from the optical modulation section; an optical intensity detecting section for receiving, as a monitoring optical signal, one of the optical signals outputted from the light branching section, and detecting an intensity of the received optical signal; and a control section for obtaining an optical intensity maximum value and an optical intensity minimum value, which determine an extinction ratio of the optical modulation section, based on the signal intensity detected by the optical intensity detecting section, and for obtaining amplitudes of the two electric signals or an amplitude ratio therebetween such that the sideband component can be made to disappear based on the optical intensity maximum value and the optical intensity minimum value. In such a case, the amplitude adjusting section adjusts an amplitude of the received electric signal based on the amplitudes or the amplitude ratio obtained by the control section.

Then, it is possible to obtain the optical intensity maximum value and the optical intensity minimum value, which determine the extinction ratio of the optical modulation section, and to thereby obtain amplitudes of electric signals or an amplitude ratio therebetween such that a sideband component of the optical intensity-modulated signal can be made to disappear based on the optical intensity maximum value and the optical intensity minimum value.

The control section may include a storage section for storing a relationship of the optical intensity maximum value and the optical intensity minimum value with respect to the amplitudes of the two electric signals or the amplitude ratio therebetween. With this configuration, the control section can quickly obtain the amplitudes of the two electric signals or the amplitude ratio therebetween based on the information stored in the storage section.

For example, a modulation process performed by the optical modulation section is a single-sideband modulation. The modulation process performed by the optical modulation section may alternatively be a single-sideband suppressed-optical carrier modulation.

The control section performs a control of sweeping only one of DC bias voltages applied to the two routes of optical waveguide in order to obtain the optical intensity maximum value and the optical intensity minimum value.

Alternatively, the control section may perform a control of sweeping only one of DC bias voltages applied to three MZ interferometers forming the optical modulation section in order to obtain the optical intensity maximum value and the optical intensity minimum value, the one of DC bias voltages being a DC bias voltage applied to a latter one of the three MZ interferometers.

The optical transmission device may further include: a first light branching section for branching an optical carrier outputted from the light source; a first optical intensity detecting section for receiving, as a monitoring optical carrier, a branch optical carrier outputted from the first light branching section, and detecting an intensity of the received optical carrier; a second light branching section for branching an optical signal outputted from the optical modulation section; a second optical intensity detecting section for receiving, as a monitoring optical signal, a branch optical signal outputted from the second light branching section, and detecting an intensity of the received optical signal; and a control section for obtaining an optical intensity minimum value, which is a factor that determines an extinction ratio of the optical modulation section, based on the signal intensity detected by the second optical intensity detecting section, and obtaining amplitudes of the two electric signals or an amplitude ratio therebetween such that the unnecessary sideband component can be made to disappear based on the optical intensity minimum value and the signal intensity detected by the first optical intensity detecting section. In such a case, the amplitude adjusting section adjusts an amplitude of the received electric signal based on the amplitudes or the amplitude ratio obtained by the control section.

With this configuration, it is possible to obtain an optical intensity minimum value, which is a factor that determines an extinction ratio of the optical modulation section, and to obtain amplitudes of the two electric signals or an amplitude ratio therebetween such that the unnecessary sideband component can be made to disappear based on the optical intensity minimum value and the signal intensity detected by the first optical intensity detecting section.

The control section may include a storage section for storing a relationship of the optical intensity minimum value and the signal intensity detected by the first optical intensity detecting section with respect to the amplitudes of the two electric signals or the amplitude ratio therebetween. With this configuration, the control section can quickly obtain the amplitudes of the two electric signals or the amplitude ratio therebetween based on the information stored in the storage section.

For example, a modulation process performed by the optical modulation section is a single-sideband modulation. The modulation process performed by the optical modulation section may alternatively be a single-sideband suppressed-optical carrier modulation.

The control section performs a control of sweeping only one of DC bias voltages applied to the two routes of optical waveguide of the optical modulation section in order to obtain the optical intensity minimum value.

Alternatively, the control section may perform a control of sweeping only one of DC bias voltages applied to three MZ interferometers forming the optical modulation section in order to obtain the optical intensity minimum value, the one of DC bias voltages being a DC bias voltage applied to a latter one of the three MZ interferometers.

Preferably, where an intensity ratio of an optical carrier being branched into the two routes of optical waveguide is $(1-\gamma):\gamma$, the amplitude adjusting section adjusts amplitudes $k_a$ and $k_b$ of the two electric signals so that the optical intensity ratio satisfies the following relationship:

$$(1-\gamma):\gamma = J_1(k_a):J_1(k_b) \quad \text{Expression (6)}$$

where $J_1(k_a)$ and $J_1(k_b)$ are each a Bessel function representing an intensity of a first-order sideband component of the optical intensity-modulated signal, $\gamma$ is a result of dividing an optical carrier intensity of an optical waveguide to which an electric signal adjusted to an amplitude corresponding to $k_a$ is applied by a sum of the optical carrier intensity of the optical waveguide to which the electric signal adjusted to the amplitude corresponding to $k_a$ is applied and an optical carrier intensity of an optical waveguide to which an electric signal adjusted to an amplitude corresponding to $k_b$ is applied.

Preferably, the amplitude adjusting section adjusts an amplitude of the received electric signal so that an intensity of a difference beat signal between a sideband component that is necessary for transmitting information and the unnecessary sideband component does not exceed a reference intensity.

The present invention is directed also to a characteristics evaluator for evaluating characteristics of an optical modulation section, wherein the optical modulation section branches an optical carrier into two routes of optical waveguide, varies a phase of each of the optical carriers branched into two routes with a high-frequency signal, and combines together the two routes of optical carrier whose phases are varied to thereby generate an intensity-modulated optical signal. The characteristics evaluator measures an optical intensity outputted from the optical modulation section, and obtains an optical intensity maximum value and an optical intensity minimum value, which determine an extinction ratio of the optical modulation section, based on the measured optical intensity, to thereby derive a ratio between a desired optical component and an undesired optical component outputted from the optical modulation section, based on the optical intensity maximum value and the optical intensity minimum value.

For example, a modulation process performed by the optical modulation section is a single-sideband modulation. The modulation process performed by the optical modulation section may alternatively be a single-sideband suppressed-optical carrier modulation.

Preferably, the characteristics evaluator performs a control of sweeping only one of DC bias voltages applied to the two routes of optical waveguide in order to obtain the optical intensity maximum value and the optical intensity minimum value.

Alternatively, the characteristics evaluator may perform a control of sweeping only one of DC bias voltages applied to three MZ interferometers forming the optical modulation section in order to obtain the optical intensity maximum value and the optical intensity minimum value, the one of DC bias voltages being a DC bias voltage applied to a latter one of the three MZ interferometers.

The characteristics evaluator may have a function of making variable a wavelength of an optical signal inputted to the optical modulation section, which is being measured, or a function of making variable a power of an optical signal inputted to the optical modulation section, which is being measured.

The present invention is directed also to a compensator for compensating for characteristics of an optical modulation section, wherein the optical modulation section branches an optical carrier into two routes of optical waveguide, varies a phase of each of the optical carriers branched into two routes with a high-frequency signal, and combines together the two routes of optical carrier whose phases are varied to thereby generate an intensity-modulated optical signal. The compensator includes: a signal generating section for outputting an electric signal; an electric signal branching section for branching the electric signal outputted from the signal generating section into two electric signals having a predetermined phase difference therebetween; and an amplitude adjusting section for receiving at least one of the two electric signals outputted from the electric signal branching section and adjusting an amplitude of the received electric signal. Where the optical modulation section cannot evenly branch an intensity of the optical carrier into the two routes of optical waveguide, the amplitude adjusting section adjusts an amplitude of the received electric signal so that an unnecessary sideband component of the optical intensity-modulated signal outputted from the optical modulation section disappears.

Preferably, the compensator further includes: a light branching section for branching an optical signal outputted from the optical modulation section; an optical intensity detecting section for receiving, as a monitoring optical signal, one of the optical signals outputted from the light branching section, and detecting an intensity of the received optical signal; and a control section for obtaining an optical intensity maximum value and an optical intensity minimum value, which determine an extinction ratio of the optical modulation section, based on the signal intensity detected by the optical intensity detecting section, and for obtaining amplitudes of the two electric signals or an amplitude ratio therebetween such that the sideband component can be made to disappear based on the optical intensity maximum value and the optical intensity minimum value. In such a case, the amplitude adjusting section adjusts an amplitude of the received electric signal based on the amplitudes or the amplitude ratio obtained by the control section.

The control section may include a storage section for storing a relationship of the optical intensity maximum value and the optical intensity minimum value with respect to the amplitudes of the two electric signals or the amplitude ratio therebetween. With this configuration, the control section can quickly obtain the amplitudes of the two electric signals or the amplitude ratio therebetween based on the information stored in the storage section.

The present invention is directed also to a method for evaluating characteristics of an optical modulation section, wherein the optical modulation section branches an optical carrier into two routes of optical waveguide, varies a phase of each of the optical carriers branched into two routes with a high-frequency signal, and combines together the two routes of optical carrier whose phases are varied to thereby generate an intensity-modulated optical signal. Specifically, the method measures an optical intensity outputted from the optical modulation section, and obtains an optical intensity maximum value and an optical intensity minimum value, which determine an extinction ratio of the optical modulation section, based on the measured optical intensity, to thereby derive a ratio between a desired optical component and an undesired optical component outputted from the optical modulation section, based on the optical intensity maximum value and the optical intensity minimum value.

According to the present invention, it is possible to provide an optical transmission device capable of solving the problem of an unnecessary residual sideband component, which occurs when an optical modulation section for performing an SSB optical modulation, an SSB-SC optical modulation, or the like, using a high-frequency signal cannot evenly branch an optical carrier due to the wavelength dependence and the manufacturing error of the optical modulation section, thereby realizing a high-quality optical intensity-modulated signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing a configuration of an optical intensity detecting section according to the first embodiment;

FIG. 4A is a diagram showing an ideal frequency spectrum of an optical intensity-modulated signal to be received by the optical intensity detecting section according to the first embodiment;

FIG. 4B is a diagram showing a frequency spectrum in a case where an optical carrier is not evenly branched into two optical waveguides of the optical modulation section;

FIG. 5 is a block diagram showing a configuration of a control section according to the first embodiment;

FIG. 6 is a diagram showing the bias voltage sweep range for obtaining an optical intensity maximum value and an optical intensity minimum value, which determine the extinction ratio of the SSB optical modulation section, according to the first embodiment;

FIG. 8 is a diagram showing the relationship between the branching ratio error $\theta$ and the amplitude ratio $R_a/R_b$, which is stored by a storage section according to the first embodiment;

FIG. 11A is a diagram showing an ideal frequency spectrum of an optical intensity-modulated signal to be outputted from the SSB-SC optical modulation section according to the second embodiment;

FIG. 11B is a diagram showing a frequency spectrum in a case where the optical carrier cannot be evenly branched into two preceding MZ interferometers 91 and 92;

FIG. 13C is a block diagram showing a configuration of a compensator according to a sixth embodiment;

FIG. 18A is a diagram showing a frequency spectrum of an optical intensity-modulated signal produced through an ideal SSB optical modulation of an optical carrier having a frequency $f_0$ with a modulated signal having a frequency $f_1$;

FIG. 18B is a diagram showing a frequency spectrum of an optical intensity-modulated signal where the branching ratio of the light branching section 960 is not 1/2 in the MZ interferometer 430 shown in FIG. 19;

DESCRIPTION OF THE PREFERRED EMBODIMENTS

Embodiments of the present invention will now be described with reference to the drawings.

First Embodiment

An optical transmission device according to a first embodiment solves the problem of the deterioration in the operation characteristics due to the wavelength dependence and the manufacturing error of an MZ interferometer inside an optical modulation section for performing a single-sideband modulation (SSB).

Figure 1:
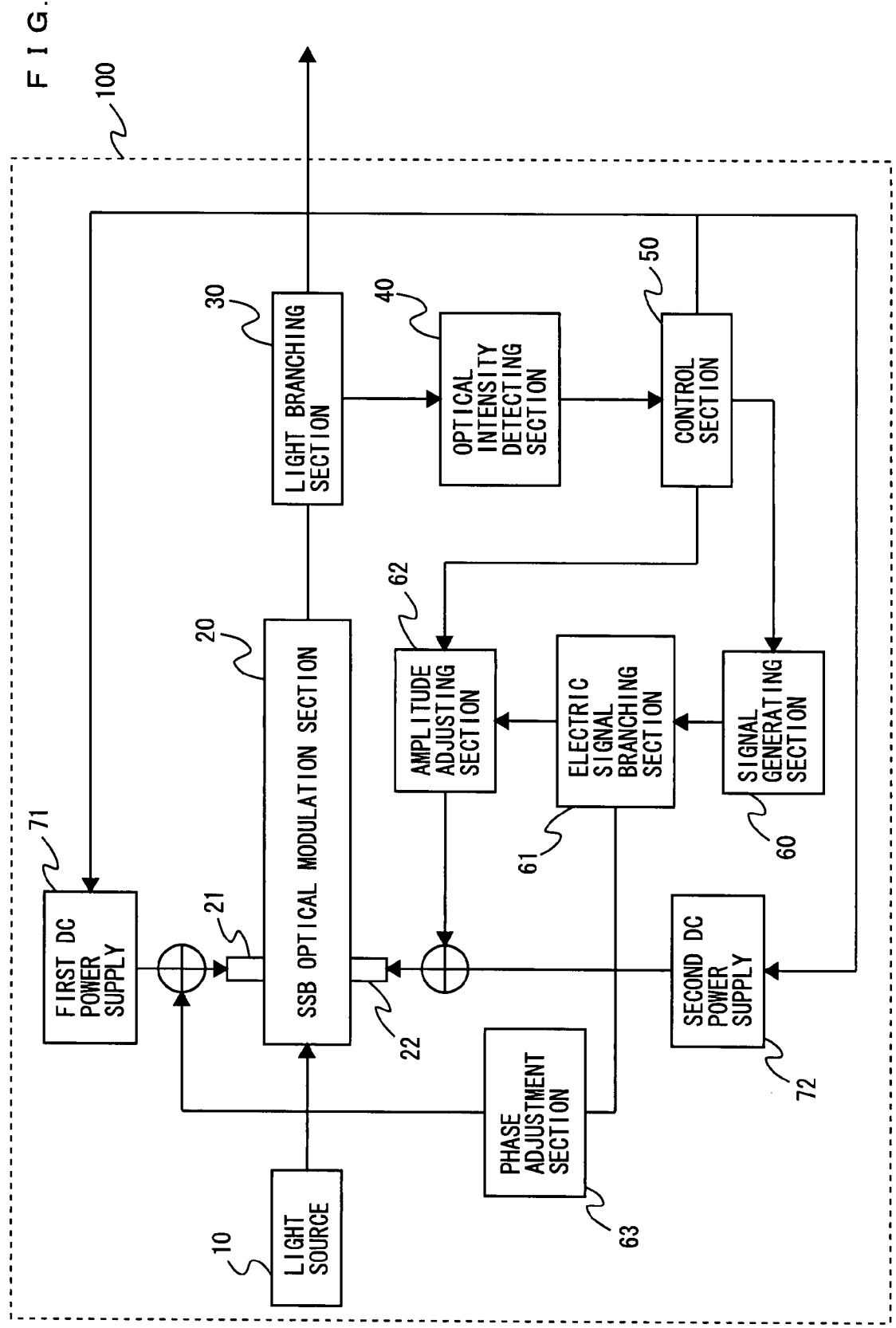
FIG. 1 is a block diagram showing a configuration of an optical transmission device according to a first embodiment.

FIG. 1 is a block diagram showing a configuration of the optical transmission device according to the first embodiment. Referring to FIG. 1, an optical transmission device 100 includes a light source 10, an SSB optical modulation section 20, a light branching section 30, an optical intensity detecting section 40, a control section 50, a signal generating section 60, an electric signal branching section 61, an amplitude adjusting section 62, a phase adjustment section 63, a first DC power supply 71, and a second DC power supply 72.

The light source 10 outputs an unmodulated optical carrier having a frequency $f_0$. The signal generating section 60 outputs an electric signal having a predetermined frequency $f_1$ that contains information to be transmitted. The electric signal is a high-frequency RF (radio frequency) signal.

Figure 2:
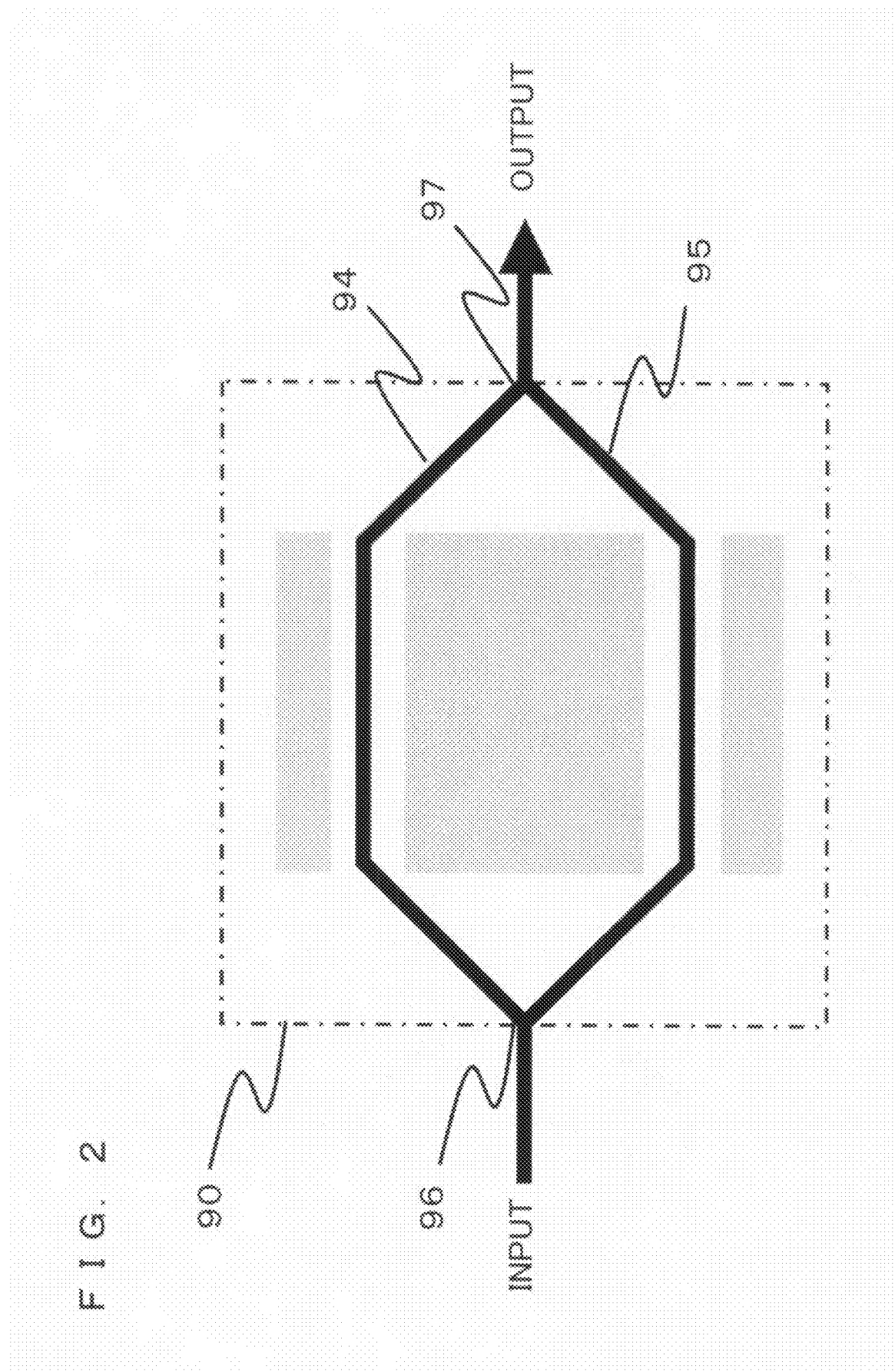
FIG. 2 is a diagram showing a configuration of an SSB optical modulation section according to the first embodiment.
Figure 7:
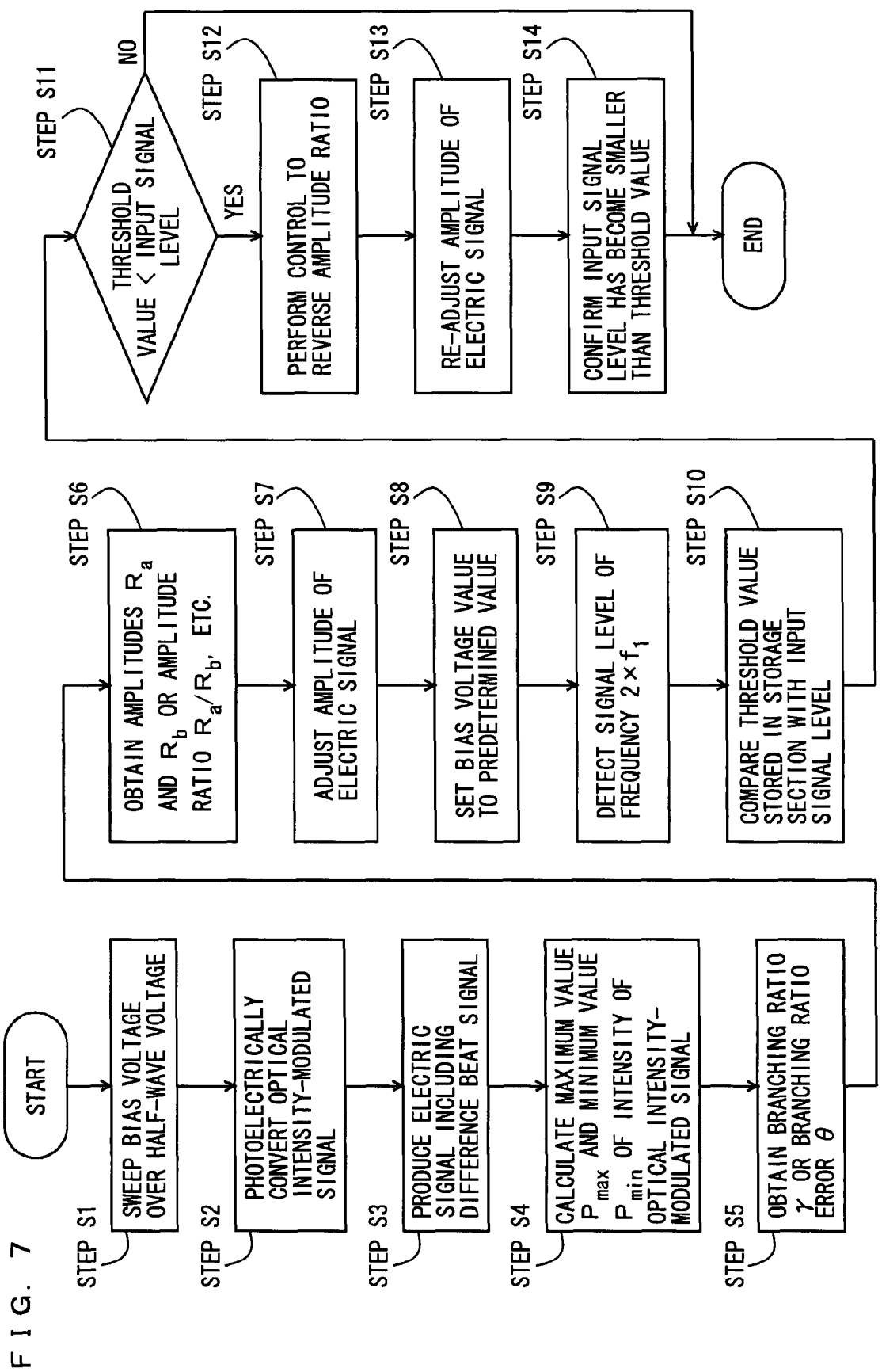
FIG. 7 is a flow chart showing an operation of the optical transmission device according to the first embodiment.

The SSB optical modulation section 20 includes an MZ interferometer 90 as shown in FIG. 2. The MZ interferometer 90 includes a light branching section 96 located at the input end, a first optical waveguide 94, a second optical waveguide 95, and an optocoupler section 97 located at the output end.

The optical carrier inputted from the light source 10 is branched through the light branching section 96 into the first optical waveguide 94 and the second optical waveguide 95. A bias voltage (DC voltage) outputted from the first DC power supply 71 and a voltage of an electric signal that is outputted from the electric signal branching section 61 and whose phase is adjusted by the phase adjustment section 63 are applied to the first optical waveguide 94. The optical carrier passing through the first optical waveguide 94 is phase-modulated with these applied voltages.

A bias voltage (DC voltage) outputted from the second DC power supply 72 and a voltage of an electric signal that is outputted from the electric signal branching section 61 and whose amplitude is adjusted by the amplitude adjusting section 62 are applied to the second optical waveguide 95. The optical carrier passing through the second optical waveguide 95 is phase-modulated with these applied voltages. The optical phase-modulated signals produced by phase modulation through the first optical waveguide 94 and the second optical waveguide 95, respectively, are combined together by the optocoupler section 97. As a result of the combining, there is produced an optical intensity-modulated signal in which one (upper or lower) sideband component is suppressed. The phase adjustment section 63 performs an operation of shifting the phase of the input electric signal by $\pi/2$ (rad). Thus, the phase of the electric signal inputted to the first optical waveguide 94 and that of the electric signal inputted to the second optical waveguide 95 are shifted from each other by $\pi/2$ (rad).

The light branching section 30 branches the optical intensity-modulated signal outputted from the SSB optical modulation section 20 into two signals. One branch signal is inputted to the optical intensity detecting section 40 as a monitoring optical signal. The other branch signal is transmitted to a base station (not shown) via an optical transmission. In order to maintain a high transmission efficiency, the branching ratio between the intensity of the optical signal to be transmitted and the intensity of the monitoring optical signal is preferably about 99:1, for example.

FIG. 3 is a block diagram showing a configuration of the optical intensity detecting section 40. FIGS. 4A and 4B are each a diagram showing a frequency spectrum of an optical intensity-modulated signal received by the optical intensity detecting section 40. FIG. 4A shows an ideal frequency spectrum, and FIG. 4B shows a frequency spectrum in a case where the optical carrier is not evenly branched into two optical waveguides of the optical modulation section 20. In the example shown in FIG. 3, the optical intensity detecting section 40 includes a photodiode 41 serving as a light-receiving section, an electric signal detecting section 42, a bandpass filter (BPF) 43, and an RF signal detecting section 44. The photodiode 41 receives a monitoring optical signal (an optical intensity-modulated signal or an unmodulated optical signal) outputted from the light branching section 30. The photodiode 41 has squared detection characteristics and detects the received optical signal in squared detection to convert the optical signal into an electric signal (i.e., photoelectrically convert the optical signal).

Since the photodiode 41 has squared detection characteristics, the output electric signal is as follows. In a case where an optical intensity-modulated signal having an ideal optical spectrum as shown in FIG. 4A is inputted to the photodiode 41, the photodiode 41 outputs a difference beat signal between a sideband component necessary for transmitting information and the carrier component. Then, the difference beat signal is a signal having a frequency $f_1$. On the other hand, in a case where there remains an unnecessary sideband component, which has supposedly disappeared, as shown in FIG. 4B, the photodiode 41 outputs a difference beat signal between the necessary sideband component and the unnecessary sideband component as well as the difference beat signal having a frequency $f_1$. Then, the difference beat signal is a signal having a frequency $2\times f_1$. The photodiode 41 inputs the difference beat signal, which has been obtained through photoelectric conversion, to each of the electric signal detecting section 42 and the bandpass filter (BPF) 43.

The electric signal detecting section 42 detects a direct-current component of the optical signal intensity detected by the optical intensity detecting section 40. The level of the direct-current component corresponds to the intensity of the optical signal inputted to the photodiode 41. After detecting the level of the direct-current component, the electric signal detecting section 42 calculates the intensity of the optical signal inputted to the photodiode 41 based on the level to output the result as an optical intensity information signal. The optical intensity information signal is inputted to the control section 50.

If there remains an unnecessary sideband component, the bandpass filter 43 receives the difference beat signal having a frequency $f_1$ and the difference beat signal having a frequency $2\times f_1$. The bandpass filter 43 performs a filtering operation of passing only frequencies in the vicinity of the frequency $2\times f_1$. Thus, the bandpass filter 43 can extract the difference beat signal having a frequency $2\times f_1$, which indicates the presence of the unnecessary sideband component.

The RF signal detecting section 44 detects the difference beat signal having a frequency $2\times f_1$, which has passed through the bandpass filter 43. Thus, it is possible to detect the presence of the unnecessary sideband component. The RF signal detecting section 44 inputs to the control section 50 a signal indicating that the unnecessary sideband component has been detected.

FIG. 5 is a block diagram showing a configuration of the control section 50. FIG. 6 is a diagram showing the bias voltage sweep range for obtaining a signal intensity maximum value and a signal intensity minimum value, which determine the extinction ratio of the SSB optical modulation section 20. The curve shown in FIG. 6 represents the modulation characteristics of the SSB optical modulation section 20. The horizontal axis represents the bias voltage applied to the SSB optical modulation section 20, and the vertical axis represents the intensity of the optical intensity-modulated signal outputted from the SSB optical modulation section 20.

The control section 50 includes a determination section 51 and a storage section 52. The determination section 51 obtains the signal intensity maximum value and the signal intensity minimum value, which determine the extinction ratio of the SSB optical modulation section 20, based on the optical intensity information signal received from the electric signal detecting section 42. When determining the extinction ratio of the SSB optical modulation section 20, the voltage of the DC power supply 71 or the DC power supply 72, being a bias voltage supply source, is swept over a half-wave voltage from a predetermined value (see FIG. 6). As the voltage is varied, the intensity of the optical signal outputted from the SSB optical modulation section 20 also changes. The optical signal is photoelectrically converted by the photodiode 41, and the power of the electric signal produced by the photoelectrically conversion is detected and observed by the electric signal detecting section 42. Based on the power, the intensity maximum value Pmax and the intensity minimum value Pmin of the optical signal can be obtained in the control section 50.

The determination section 51 obtains the branching ratio γ of the SSB optical modulation section 20 based on the intensity maximum value Pmax and the intensity minimum value Pmin of the optical signal. The branching ratio γ as used herein refers to the ratio between the intensity of one of the optical carriers branched into one of two optical waveguides 94 and 95 included in the SSB optical modulation section 20 and the sum of the intensities of the optical carriers branched into the two optical waveguides 94 and 95. In order to make one sideband component disappear in the SSB optical modulation section 20, the optical carrier is supposed to be evenly branched into the two optical waveguides 94 and 95. Where the optical carrier is evenly branched, the branching ratio γ is 1/2.

However, in practice, it is difficult to make the branching ratio γ strictly 1/2, and the branching ratio γ takes a value slightly shifted from 1/2 due to a manufacturing error, or the like. In the present embodiment, it is presumed that the branching ratio γ is shifted from 1/2. In the present embodiment, the amplitudes $R_a$ and $R_b$ of the electric signals (RF signals) applied to the two optical waveguides 94 and 95 are made to be different from each other so as to set an appropriate ratio for suppressing the influence of the manufacturing error. Thus, even if the branching ratio γ is shifted from the ideal value 1/2, the influence thereof is minimized. The control section 50 obtains the voltage amplitudes $R_a$ and $R_b$ of the electric signals to be applied to the two optical waveguides 94 and 95 based on the branching ratio γ.

A method for obtaining the branching ratio γ from the intensity maximum value Pmax and the intensity minimum value Pmin of the optical signal will now be described. The intensities of the optical phase-modulated signals, which are produced as the branch optical carriers pass through the optical waveguide 94 and the optical waveguide 95, are herein denoted as $P_1$ and $P_2$, respectively. One of the DC bias voltages applied to the optical waveguide 94 and the optical waveguide 95 is swept over a half-wave voltage from a predetermined voltage. Then, the refractive index of the optical waveguide for which the applied voltage is swept changes. As the refractive index is varied, the phase of the optical phase-modulated signal, which is obtained as the optical carrier passes through the optical waveguide, gradually changes between 0 and π (rad). Accordingly, due to optical interference, the intensity of the optical intensity-modulated signal, which is obtained by combining together the two optical phase-modulated signals, varies between Pmax=$P_1$+$P_2$ and Pmin=$P_1$−$P_2$. $P_1$ and $P_2$ can be expressed as shown in Expression (7) by using Pmax and Pmin.

$$P_1 = \frac{P_{max} + P_{min}}{2}$$
$$P_2 = \frac{P_{max} - P_{min}}{2}$$

Expression (7)

Where the intensity of the optical carrier inputted to the SSB optical modulation section 20 is denoted as P and the branching ratio of the SSB optical modulation section 20 as γ, $P_1$ and $P_2$ can be expressed as shown in Expression (8). It is assumed herein that where the intensity of the optical carrier inputted to the SSB optical modulation section 20 is P, the intensity of the optical signal outputted from the SSB optical modulation section 20 is also P. It is also assumed that where the intensities of the optical phase-modulated signals corresponding to the optical waveguides are $P_1$ and $P_2$, the intensities of the optical carriers corresponding to the optical waveguides are $P_1$ and $P_2$.

$$P_1 = \gamma P, P_2 = (1-\gamma)P$$

Expression (8)

Based on Expression (7) and Expression (8), the branching ratio γ and the branching ratio error θ can be obtained. Specifically, the relationship between $P_1$ and $P_2$ is obtained from Expression (9), and the branching ratio γ and the branching ratio error θ can be expressed as shown in Expression (10).

$$\frac{P_1}{P_2} = \frac{\gamma P}{(1-\gamma)P} = \frac{\frac{P_{max} + P_{min}}{2}}{\frac{P_{max} - P_{min}}{2}} = \frac{P_{max} + P_{min}}{P_{max} - P_{min}}$$

Expression (9)

$$\gamma = \frac{P_{max} + P_{min}}{2P_{max}}$$

Expression (10)

$$\theta = 2 \times \left|\frac{1}{2} - \gamma\right| \times 100 = 2 \times \left|\frac{P_{max} - P_{min}}{2P_{max}}\right| \times 100$$

The first-order sideband component of an optical phase-modulated signal produced as the optical carrier passes through one optical waveguide can be expressed as shown in Expression (3), as described above in Description of the Background Art.

$$J_1 \text{ component} = -\gamma E J_1(k_a)[\sin \omega_0 t \cos \omega_1 t] = -\gamma E J_1(k_a)[\sin(\omega_0+\omega_1)t + \sin(\omega_0-\omega_1)t]$$

Expression (3)

Herein, $J_1(k_a)$ is a first-order Bessel function.

The first-order sideband component of an optical phase-modulated signal produced as the optical carrier passes through the other optical waveguide can be expressed as shown in Expression (5).

$$J_1 \text{component} =$$
$$-\frac{(1-\gamma)}{2} E\{2J_1(k_b)\cos(\omega_0 t)\sin\omega_1 t\}$$
$$= -(1-\gamma)EJ_1(k_b)\left\{\begin{array}{l}\sin(\omega_1+\omega_0)t + \\ \sin(\omega_1-\omega_0)t\end{array}\right\}$$
$$= -(1-\gamma)EJ_1(k_b)\left\{\begin{array}{l}\sin(\omega_0+\omega_1)t - \\ \sin(\omega_0-\omega_1)t\end{array}\right\}$$

Expression (5)

Herein, $J_1(k_b)$ is a first-order Bessel function.

The following method can be used to combine together an optical phase-modulated signal produced as the optical carrier passes through one optical waveguide and an optical phase-modulated signal produced as the optical carrier passes through the other optical waveguide to thereby obtain an optical intensity-modulated signal in which an unnecessary sideband component has disappeared. That is, the sin ($\omega_0$−$\omega_1$)t component in Expression (3) and the sin($\omega_0$−$\omega_1$)t component in Expression (5) can be allowed to be canceled out by each other. For this cancellation to occur, the amplitudes $R_a$ and $R_b$ of the electric signals to be applied to the optical waveguides may be adjusted so that Expression (11) below holds.

$$(1-\gamma)E \cdot \gamma E = J_1(k_a) \cdot J_1(k_b)$$

Expression (11)

Herein, γ is the result of dividing the intensity of an optical carrier branched into an optical waveguide to which an electric signal adjusted to an amplitude corresponding to $k_a$ is applied by the sum of the intensity of the optical carrier branched into the optical waveguide to which the electric signal adjusted to the amplitude corresponding to $k_a$ is applied and the intensity of a optical carrier branched into an optical waveguide to which an electric signal adjusted to an amplitude corresponding to $k_b$ is applied.

The determination section 51 obtains the amplitudes $R_a$ and $R_b$, which satisfy Expression (11) above, based on the branching ratio γ, and inputs the information signal of the obtained amplitudes $R_a$ and $R_b$ to the amplitude adjusting section 62. The amplitude adjusting section 62 adjusts the amplitude of the electric signal inputted from the electric signal branching section 61 to $A \times (R_b/R_a)$. Herein, A is the amplitude of the electric signal outputted from the electric signal branching section 61. The voltage amplitude ratio between the electric signals applied to the two optical waveguides is $R_a:R_b$. Therefore, a voltage of an electric signal satisfying Expression (11) above can be applied to each optical waveguide.

The voltage of the electric signal adjusted to the amplitude $A \times (R_b/R_a)$ is superposed over the bias voltage outputted from the second DC power supply 72. The superposed voltage is inputted to a port 22, and applied to the optical waveguide 95. The voltage of the amplitude-unadjusted electric signal, which is outputted from the electric signal branching section 61 and not inputted to the amplitude adjusting section 62, is superposed over the bias voltage outputted from the first DC power supply 71. The superposed voltage is inputted to a port 21, and applied to the other optical waveguide 94.

The control section 50 also has a function of determining whether the amplitude control operation has been performed appropriately, in addition to the amplitude adjustment function. When a signal having a frequency $2 \times f_1$ is received from the bandpass filter 43, the determination section 51 determines whether the intensity of the signal exceeds a reference intensity. If so, it is determined that the unnecessary sideband component is not suppressed appropriately, and if not, it is determined that the unnecessary sideband component is suppressed appropriately. If it is determined that the suppression is not performed appropriately, the determination section 51 issues a command to the amplitude adjusting section 62 such that the amplitude ratio is reversed with respect to that for the previous amplitude adjustment operation. Thus, the amplitude adjusting section 62 adjusts the amplitude of the electric signal inputted from the electric signal branching section 61 to $A \times (R_a/R_b)$. Thus, the amplitude ratio between the electric signal voltages applied to the optical waveguide 94 and the optical waveguide 95 is $R_b:R_a$, whereby the amplitude ratio is reversed with respect to that for the previous amplitude adjustment operation.

The reason for reversing the amplitude ratio is as follows. While the branching ratio γ of the SSB optical modulation section 20 can be obtained from the intensity maximum value and the intensity minimum value of the output signal from the SSB optical modulation section 20, it is unknown which one of the optical waveguide 94 and the optical waveguide 95 is receiving light of a higher intensity. However, if the unnecessary sideband component does not appear even after amplitude adjustment, it is known that the amplitude ratio between the electric signal voltages applied to the optical waveguide 94 and the optical waveguide 95 is opposite to an amplitude ratio that is supposed to be applied. Thus, the unnecessary sideband component can be made to disappear by setting the amplitude ratio between the electric signal voltages to be applied to the optical waveguide 94 and the optical waveguide 95 to an opposite amplitude ratio and performing an amplitude adjustment again.

Now, the step of correcting the wavelength dependence and a manufacturing error of the MZ interferometer inside the SSB optical modulation section 20 will be described with reference to the flow chart shown in FIG. 7 and FIGS. 1 to 6, as an operation of the optical transmission device according to the first embodiment. In order to grasp the maximum value Pmax and the minimum value Pmin of the optical signal outputted from the SSB optical modulation section 20, the bias voltage of one of the first DC power supply 71 and the second DC power supply 72 is swept over a half-wave voltage by the control section 50 (step S1). Then, as the refractive index of the optical waveguide of which the voltage is swept changes, the intensity of the optical signal also changes. The intensity of the optical signal changes between the maximum value Pmax and the minimum value Pmin. The light branching section 30 branches the optical signal into two. One of the branch signals with a higher intensity is transmitted to a base station via an optical transmission path, and one with a lower intensity is inputted to the optical intensity detecting section 40 as the monitoring signal. At this time, the electric signal outputted from the signal generating section 60 may or may not be inputted to input ports 21 and 22.

The photodiode 41 of the optical intensity detecting section 40 has two functions of detecting the optical signal intensity, and detecting the optical intensity-modulated signal in squared detection and photoelectrically converting the signal (step S2). The intensity of the optical signal is detected based on the direct-current component of the optical signal intensity, irrespective of whether the optical signal is modulated or not. Where the electric signal outputted from the signal generating section 60 is inputted to the input ports 21 and 22, i.e., where the optical signal is intensity-modulated, the photodiode 41 produces, through squared detection, an electric signal including a first difference beat signal representing the frequency difference between the optical carrier component and the necessary sideband component, and a second difference beat signal representing the frequency difference between the unnecessary sideband component and the necessary sideband component (step S3).

The electric signal detecting section 42 detects a direct-current component of the optical signal intensity detected by the optical intensity detecting section 40. The level of the direct-current component corresponds to the intensity of the optical signal inputted to the photodiode 41. After detecting the level of the direct-current component, the electric signal detecting section 42 calculates the intensity of the optical signal inputted to the photodiode 41 based on the level. The electric signal detecting section 42 measures the intensity of the optical signal over a period of time corresponding to the sweep to thereby calculate the maximum value Pmax and the minimum value Pmin of the intensity of the optical signal (step S4). The electric signal detecting section 42 inputs to the control section 50 a signal representing the maximum value Pmax and the minimum value Pmin.

The maximum value Pmax and the minimum value Pmin of the intensity of the optical signal are inputted to the determination section 51 of the control section 50. The determination section 51 obtains the branching ratio γ or the branching ratio error θ by substituting the maximum value Pmax and the minimum value Pmin into Expression (10) above (step S5). The storage section 52 of the control section 50 stores the relationship between the branching ratio γ or the branching ratio error θ and the amplitudes $R_a$ and $R_b$. The storage section 52 may store the relationship between the branching ratio error θ and the amplitude ratio $R_a/R_b$ as shown in FIG. 8, for example. Alternatively, the relationship between the branching ratio γ and the amplitude ratio $R_a/R_b$ may be stored. The determination section 51 of the control section 50 compares the obtained branching ratio γ or the obtained branching ratio error θ with information stored in the storage section 52 to thereby obtain the amplitudes $R_a$ and $R_b$ or the amplitude ratio $R_a/R_b$, etc. (step S6). The determination section 51 may obtain the amplitudes $R_a$ and $R_b$ or the amplitude ratio $R_a/R_b$, etc., by substituting the branching ratio γ or the branching ratio error θ into Expression (11).

The determination section 51 inputs information of the obtained amplitude to the amplitude adjusting section 62. The amplitude adjusting section 62 adjusts the amplitude of the electric signal inputted from the electric signal branching section 61 so that the ratio between the amplitude of the electric signal applied to one optical waveguide and the amplitude of the electric signal applied to the other optical waveguide is $R_a:R_b$ (step S7). The determination section 51 sets bias voltage values outputted from the first DC power supply 71 and the second DC power supply 72 to predetermined values (step S8). The predetermined bias voltage values are values such that a desired optical spectrum can be obtained.

The RF signal detecting section 44 of the optical intensity detecting section 40 detects the signal level at the frequency $2 \times f_1$ ($f_1$ is the frequency of the RF signal), which suggests the possibility of the existence of the unnecessary sideband component in order to detect whether the unnecessary sideband component has disappeared by the above amplitude settings (step S9). A signal representing the detected signal level is inputted to the determination section 51 of the control section 50. The determination section 51 compares the threshold value stored in the storage section 52 and the input signal level (step S10). If the input signal level is greater than the threshold value (YES in step S11), it is determined that the unnecessary sideband component has not disappeared. If the input signal level is less than or equal to the threshold value (NO in step S11), it is determined that the unnecessary sideband component has disappeared. If it is determined that the unnecessary sideband component has disappeared, the process ends.

The determination section 51 re-adjusts the amplitude when it is determined that the unnecessary sideband component has not disappeared. Specifically, the determination section 51 inputs an amplitude information signal to the amplitude adjusting section 62 so that the amplitude ratio between the electric signal applied to one optical waveguide and the electric signal applied to the other optical waveguide is opposite to the amplitude ratio in the previous amplitude adjustment (step S12). The amplitude adjusting section 62 adjusts the amplitude of the electric signal inputted from the electric signal branching section 61 so that the ratio between the amplitude of the electric signal applied to one optical waveguide and the amplitude of the electric signal applied to the other optical waveguide is $R_b:R_a$, i.e., opposite to that in the previous amplitude adjustment (step S13). The determination section 51 compares the threshold value and the input signal level with each other to confirm that the input signal level has become smaller than the threshold value (step S14), and the process ends.

With the above control operation, the branching ratio γ of the SSB optical modulation section 20 is obtained, and then an appropriate amplitude based on the branching ratio γ is given to the electric signal. This suppresses the influence of the shift from 1/2 of the branching ratio γ on the optical intensity-modulated signal, whereby it is possible to obtain a high-quality optical intensity-modulated signal where the unnecessary sideband component has disappeared.

In the example shown in FIG. 1, the amplitude adjusting section 62 receives only one of the two electric signals outputted from the electric signal branching section 61 to adjust the amplitude of the electric signal. Alternatively, the optical transmission device of the present embodiment can be configured as follows. That is, the amplitude adjusting section 62 may receive both of the two electric signals outputted from the electric signal branching section 61 to adjust the amplitudes of the electric signals. In such a case, the SSB optical modulation section 20 receives two amplitude-adjusted electric signals from the amplitude adjusting section 62, and can modulate optical carriers passing through the two optical waveguides 94 and 95 with the two amplitude-adjusted electric signals. The two electric signals may be amplitude-adjusted by one amplitude adjusting section 62, or the two electric signals may be amplitude-adjusted separately by two amplitude adjusting sections (not shown).

Second Embodiment

Figure 9:
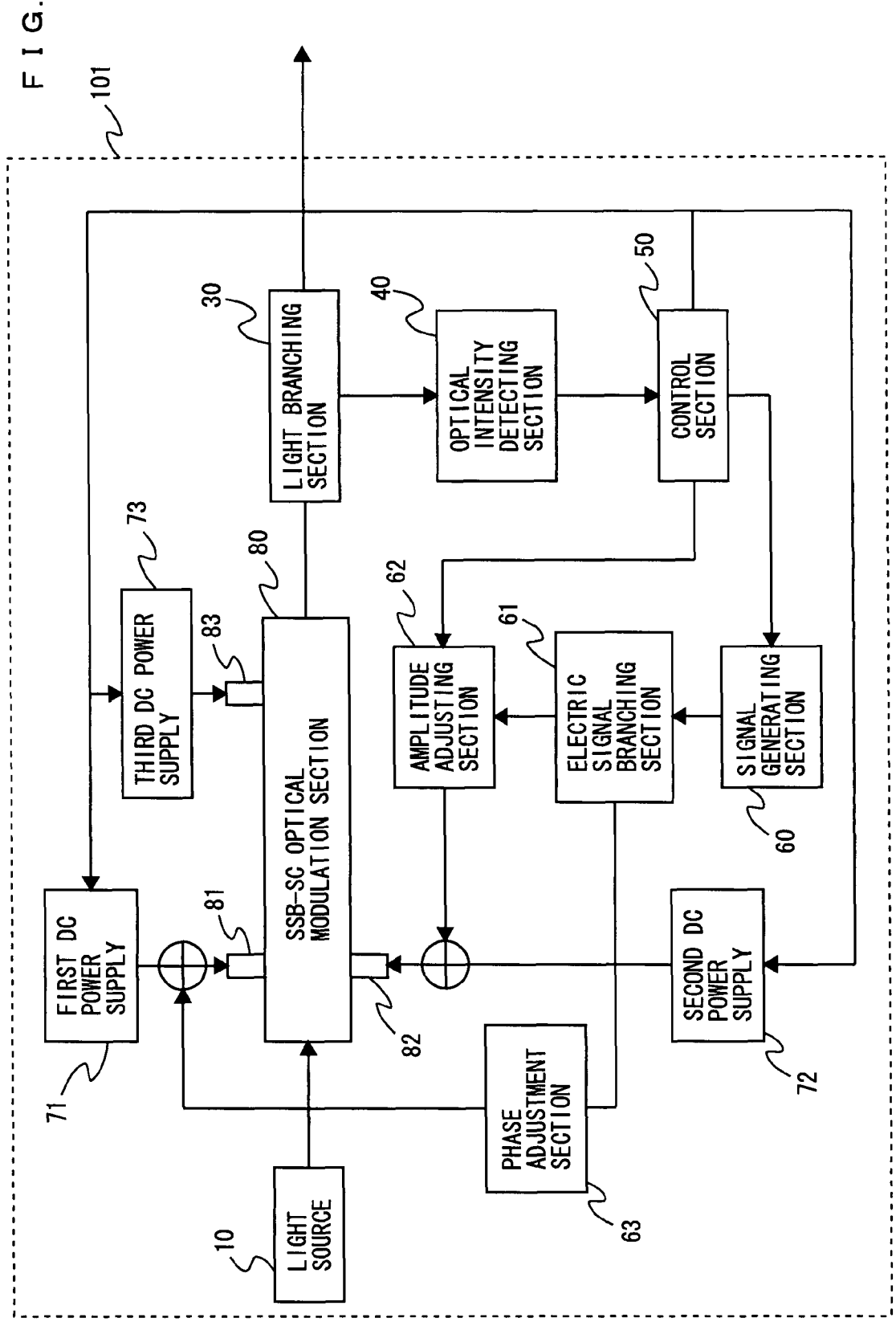
FIG. 9 is a block diagram showing a configuration of an optical transmission device according to a second embodiment.
Figure 10:
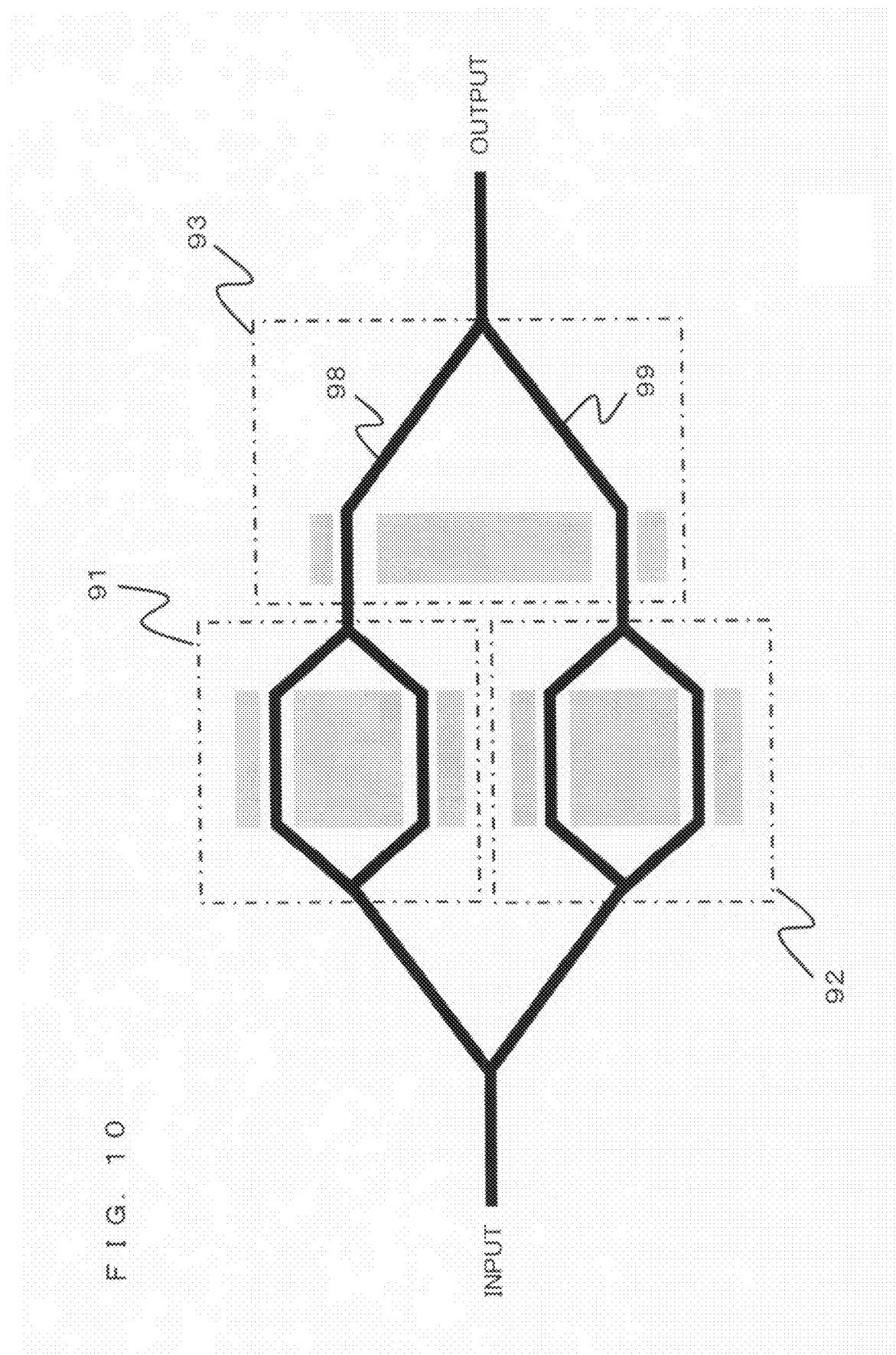
FIG. 10 is a diagram showing a configuration of an SSB-SC optical modulation section according to the second embodiment.

FIG. 9 is a block diagram showing a configuration of an optical transmission device according to a second embodiment of the present invention. FIG. 10 is a diagram showing a configuration of an SSB-SC optical modulation section 80 in the optical transmission device of the second embodiment. FIGS. 11A and 11B each show a frequency spectrum of an optical intensity-modulated signal outputted from the SSB-SC optical modulation section 80. FIG. 11A shows an ideal frequency spectrum, and FIG. 11B shows a frequency spectrum in a case where the optical carrier cannot be evenly branched into two preceding MZ interferometers 91 and 92.

An optical transmission device 101 of the second embodiment solves the problem of the deterioration in the operation characteristics due to the wavelength dependence and the manufacturing error of an MZ interferometer inside an optical modulation section for performing a single-sideband suppressed-optical carrier modulation (hereinafter referred to as "SSB-SC").

The optical transmission device of the second embodiment is similar to the first embodiment except that the SSB optical modulation section 20 of the first embodiment is replaced by the SSB-SC optical modulation section 80, and a third DC power supply 73 is provided along with the replacement. In the following description, like elements to those of the first embodiment will be denoted by like reference numerals and will not be further described below.

As shown in FIG. 10, the SSB-SC optical modulation section 80 includes three MZ interferometers 91, 92 and 93. Input ports 81 and 82 for applying bias voltages from the first and second DC power supplies 71 and 72 and the electric signal from the signal generating section 60 are connected to the first two MZ interferometers 91 and 92. An input port 83 for applying the bias voltage from the third DC power supply 73 is connected to the latter MZ interferometer 93. The SSB-SC optical modulation section 80 includes a first route of optical waveguide and a second route of optical waveguide, wherein the first route of optical waveguide includes two optical waveguides forming the MZ interferometer 91 and one waveguide 94 of the two optical waveguides forming the MZ interferometer 93, and the second route of optical waveguide includes two optical waveguides forming the MZ interferometer 92 and the other waveguide 95 of the two optical waveguides forming the MZ interferometer 93.

The SSB optical modulation section 20 of the first embodiment described above includes one MZ interferometer 90 and two input ports 21 and 22 for applying voltages to the two optical waveguides 94 and 95 forming the MZ interferometer. In the first embodiment, the bias voltage for one of the ports is swept over a half-wave voltage in order to obtain the maximum value Pmax and the minimum value Pmin of the intensity of the optical signal.

In the second embodiment, an electric signal voltage applied to two optical waveguides 98 and 99 of the latter MZ interferometer 93 is swept over a half-wave voltage in order to obtain the maximum value Pmax and the minimum value Pmin of the intensity of the optical signal. With the sweeping, it is possible to obtain the maximum value Pmax and the minimum value Pmin of the intensity of the optical signal. Once the maximum value Pmax and the minimum value Pmin are obtained, the unnecessary sideband component can then be made to disappear as shown in FIG. 11A through similar steps to those of the first embodiment.

Third Embodiment

Figure 12:
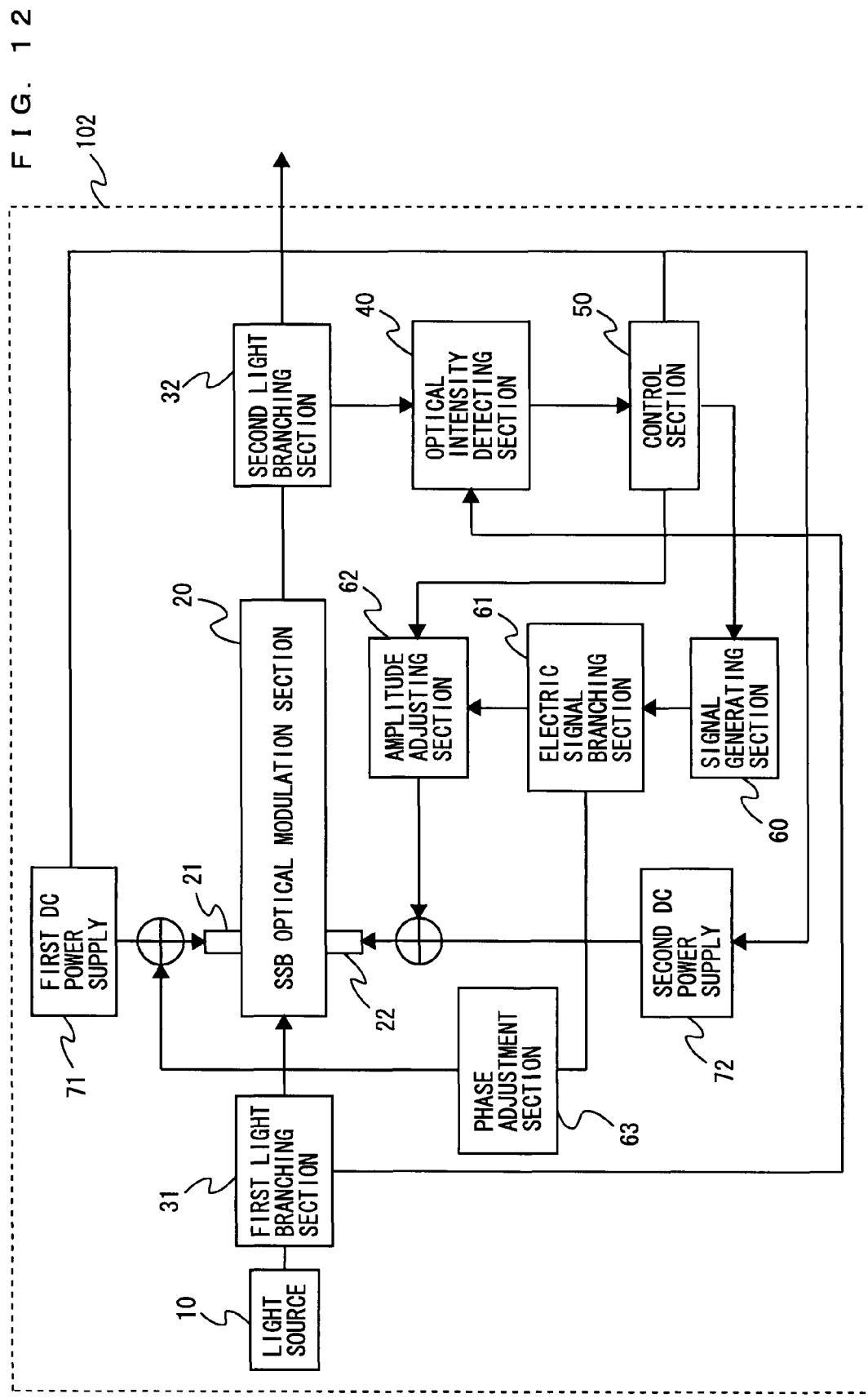
FIG. 12 is a block diagram showing a configuration of an optical transmission device according to a third embodiment.

FIG. 12 is a block diagram showing a configuration of an optical transmission device according to a third embodiment of the present invention. An optical transmission device 102 of the third embodiment differs from that of the first embodiment as follows. Specifically, the third embodiment is similar to the first embodiment except that a first light branching section 31 is provided between the SSB optical modulation section 20 and the light source 10, and a portion of the output from the first light branching section 31 is inputted to the optical intensity detecting section 40. In the following description, like elements to those of the first embodiment will be denoted by like reference numerals and will not be further described below. While a second light branching section 32 is provided in the third embodiment, it is the same as the light branching section 30 of the first embodiment.

The first light branching section 31 branches the optical carrier inputted from the light source 10 into two, and inputs one of the branch signals with a higher optical intensity to the SSB optical modulation section 20 while inputting the other one of the branch signals with a lower optical intensity to the optical intensity detecting section 40 as the first monitoring optical signal.

As does the first embodiment, the second light branching section 32 branches the optical signal inputted from the SSB optical modulation section 20 into two, and outputs one of the branch signals with a higher optical intensity to a base station via an optical transmission path while inputting the other one of the branch signals with a lower optical intensity to the optical intensity detecting section 40 as the second monitoring optical signal. The optical intensity detecting section 40 obtains the branching ratio γ of the SSB optical modulation section 20 based on the received first monitoring optical signal and the received second monitoring optical signal. The method of calculation will now be described.

The intensity of the optical carrier inputted to the first light branching section 31 is herein denoted as P, the intensity of the optical carrier branched through the first light branching section 31 and inputted to the SSB optical modulation section 20 as $P_{11}$, and the intensity of the first monitoring optical signal inputted to the optical intensity detecting section 40 as $P_{12}=P-P_{11}$. Using the branching ratio γ of the SSB optical modulation section 20, the intensity $P_1$ of the optical carrier inputted to one optical waveguide and the intensity $P_2$ of the optical carrier inputted to the other optical waveguide can be expressed as shown in Expression (12).

$P_1 = \gamma P_{11}$ $P_2 = (1-\gamma) P_{11}$ \hfill Expression (12)

The minimum value Pmin of the intensity of the optical signal, which is obtained by sweeping the bias voltage, is equal to the difference between $P_{11}$ and $P_{12}$, and can therefore be expressed as shown in Expression (13).

$Pmin = P_1 - P_2 = (2\gamma - 1) P_{11}$ \hfill Expression (13)

Expression (13) can be transformed into Expression (14).

$$\gamma = \frac{P_{min} + P_{11}}{2 P_{11}}$$ \hfill Expression (14)

Since the intensity of the first monitoring optical signal is $P_{12}(=P-P_{11})$, Expression (14) can be expressed as shown in Expression (15) by using P and $P_{12}$.

$$\gamma = \frac{P_{min} + P - P_{12}}{2(P - P_{12})}$$ \hfill Expression (15)

The branching ratio γ can be obtained by obtaining the minimum value Pmin of the optical signal intensity, which is obtained by sweeping the bias voltage, the intensity P of the carrier outputted from the light source 10, and the intensity $P_{12}$ of the optical carrier inputted to the optical intensity detecting section 40, and substituting the obtained values into Expression (15). Once the branching ratio γ is obtained, the unnecessary sideband component can then be made to disappear through similar steps to those of the first embodiment.

Fourth Embodiment

Figure 13A:
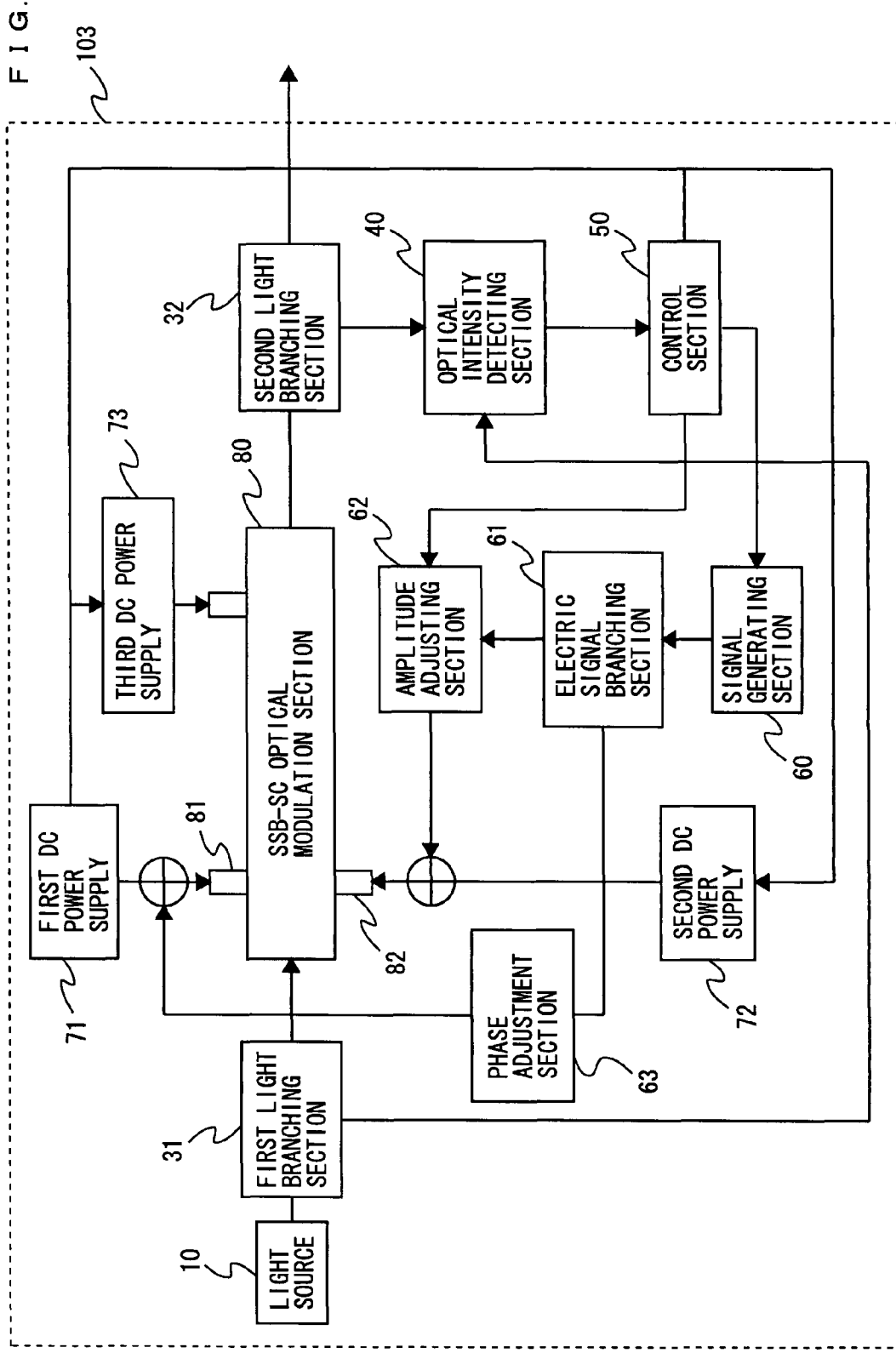
FIG. 13A is a block diagram showing a configuration of an optical transmission device according to a fourth embodiment.

FIG. 13A is a block diagram showing a configuration of an optical transmission device according to a fourth embodiment of the present invention. The optical transmission device of the fourth embodiment solves the problem of the deterioration in the operation characteristics due to the wavelength dependence and the manufacturing error of an MZ interferometer inside the SSB-SC optical modulation section 80.

An optical transmission device 103 of the fourth embodiment is similar to the third embodiment except that the SSB optical modulation section 20 of the third embodiment is replaced by the SSB-SC optical modulation section 80, and the third DC power supply 73 is provided along with the replacement. In the following description, like elements to those of the third embodiment will be denoted by like reference numerals and will not be further described below.

In the fourth embodiment, the bias voltage applied to the latter MZ interferometer 93 shown in FIG. 10 may be swept over a half-wave voltage in order to obtain the branching ratio γ of the SSB-SC optical modulation section 80. With the sweeping, the branching ratio γ of the SSB-SC optical modulation section 80 can be obtained as in the third embodiment. Once the branching ratio γ is obtained, the unnecessary sideband component can then be made to disappear through similar steps to those of the first embodiment.

Fifth Embodiment

Figure 13B:
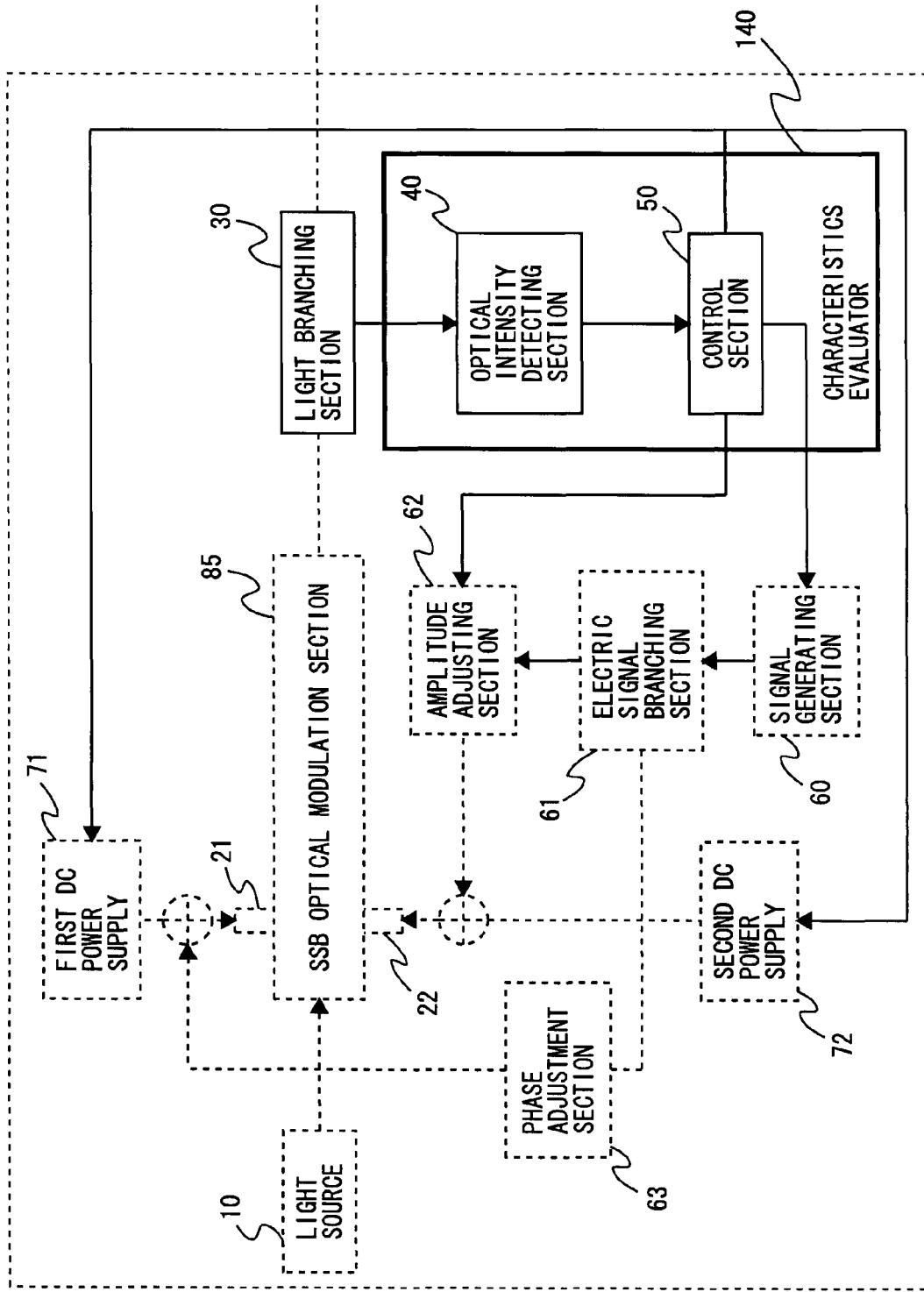
FIG. 13B is a block diagram showing a configuration of a characteristics evaluator according to a fifth embodiment.
Figure 14:
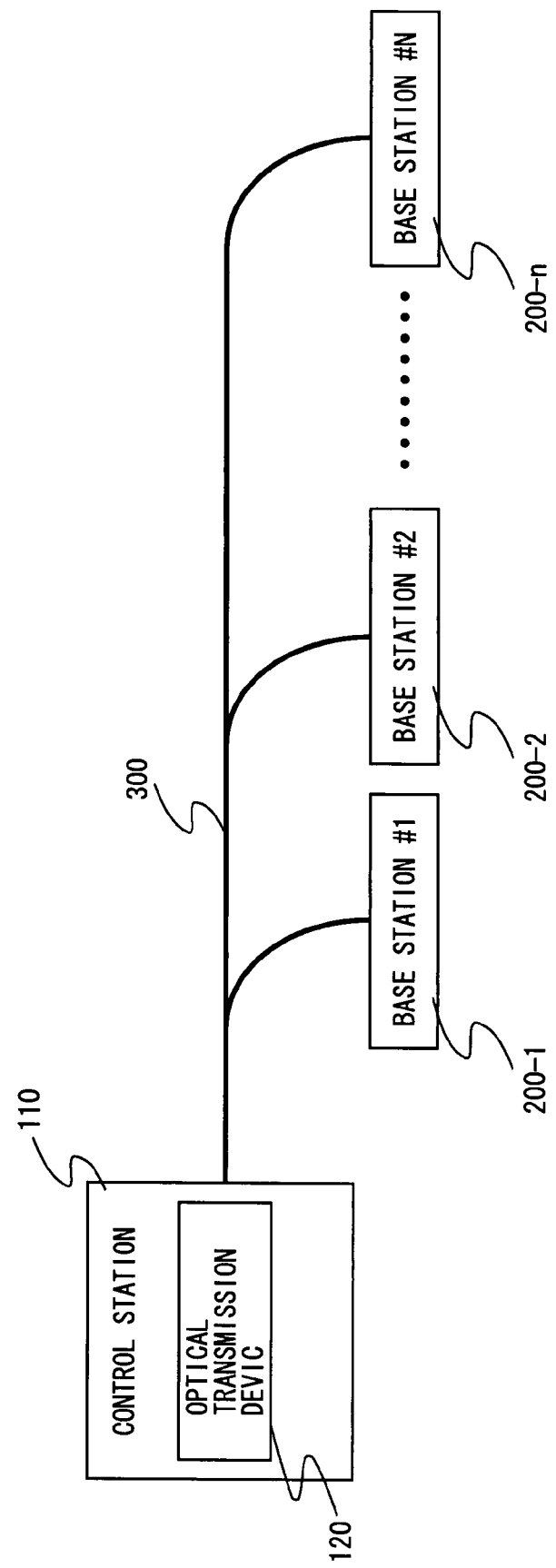
FIG. 14 is a schematic diagram showing an optical fiber network between a control station and base stations in a system for realizing wireless communications by using high-frequency signals.
Figure 15:
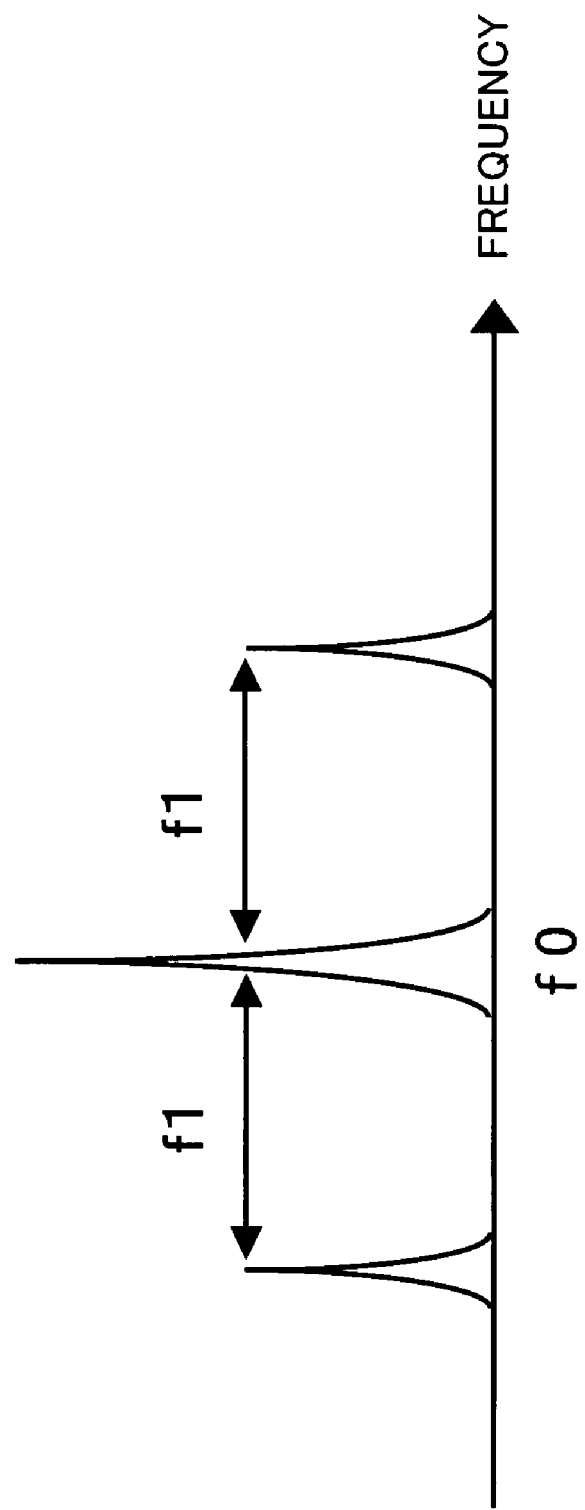
FIG. 15 is a diagram showing a frequency spectrum of an optical intensity-modulated signal produced through an optical intensity modulation such that the optical carrier component, the upper sideband component and the lower sideband component are included.
Figure 16:
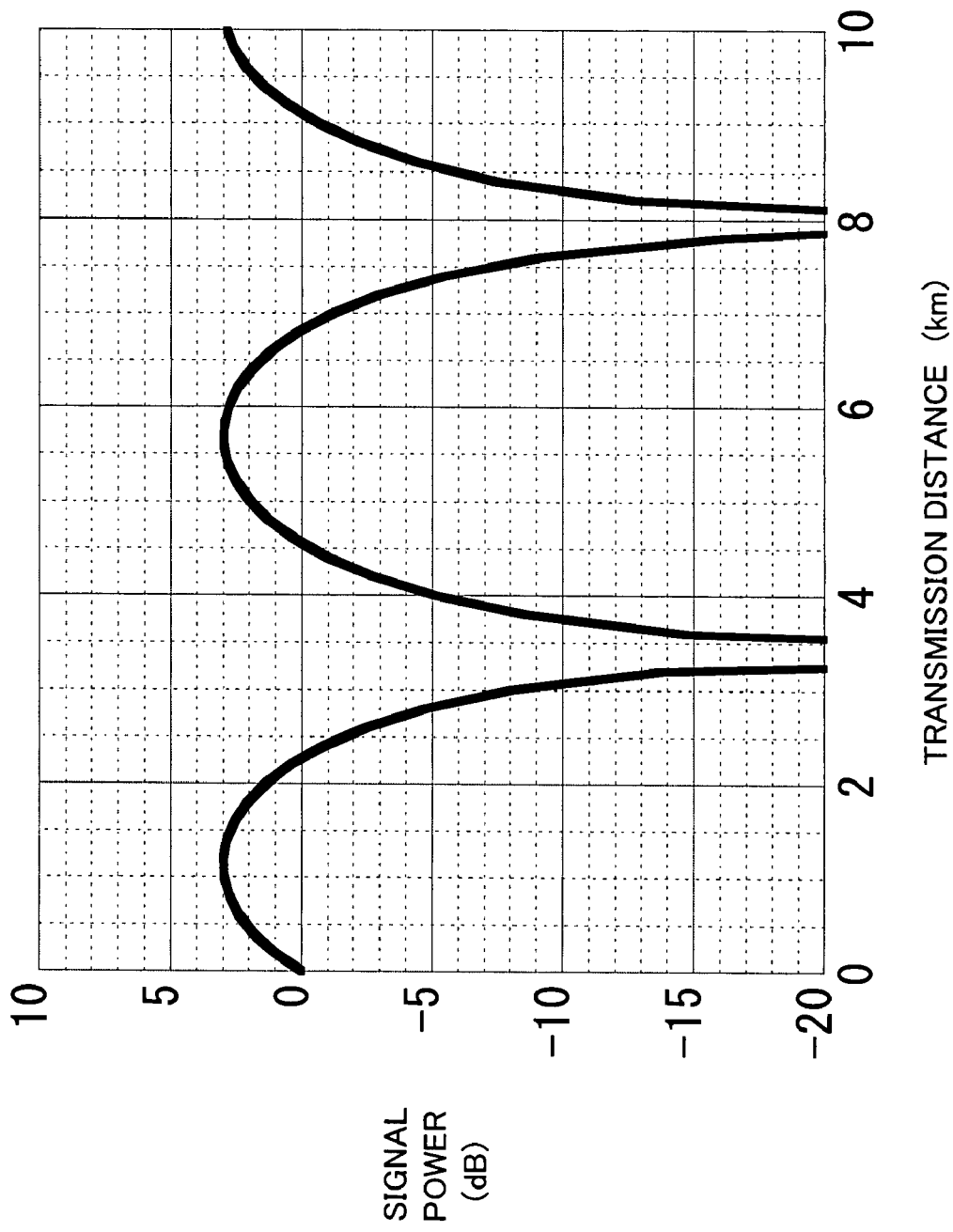
FIG. 16 is a diagram showing the relationship between the received signal power on the optical signal receiving side and the transmission distance.
Figure 17:
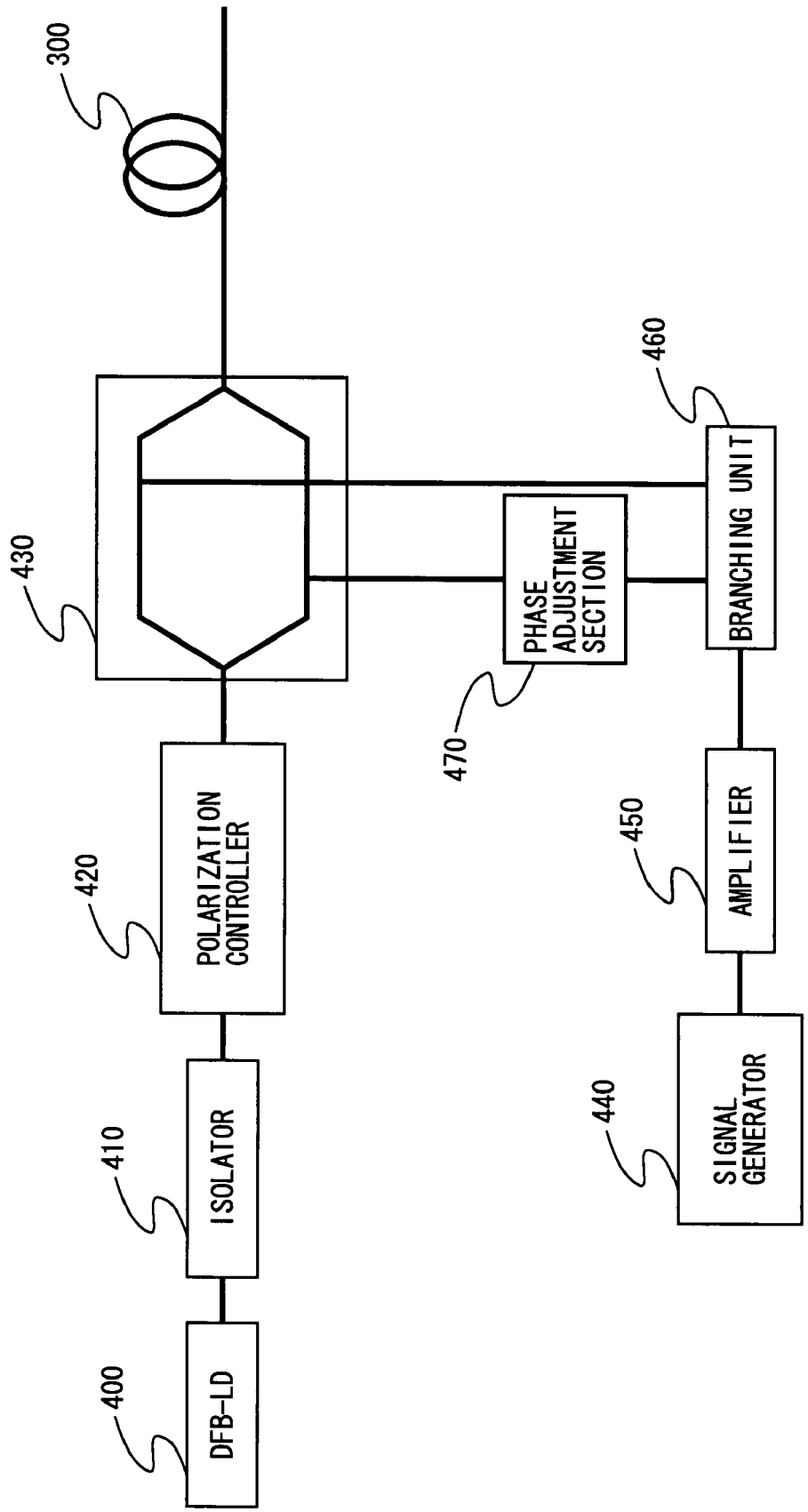
FIG. 17 is a diagram showing a configuration of a conventional optical transmission device disclosed in Non-Patent Document 1.
Figure 19:
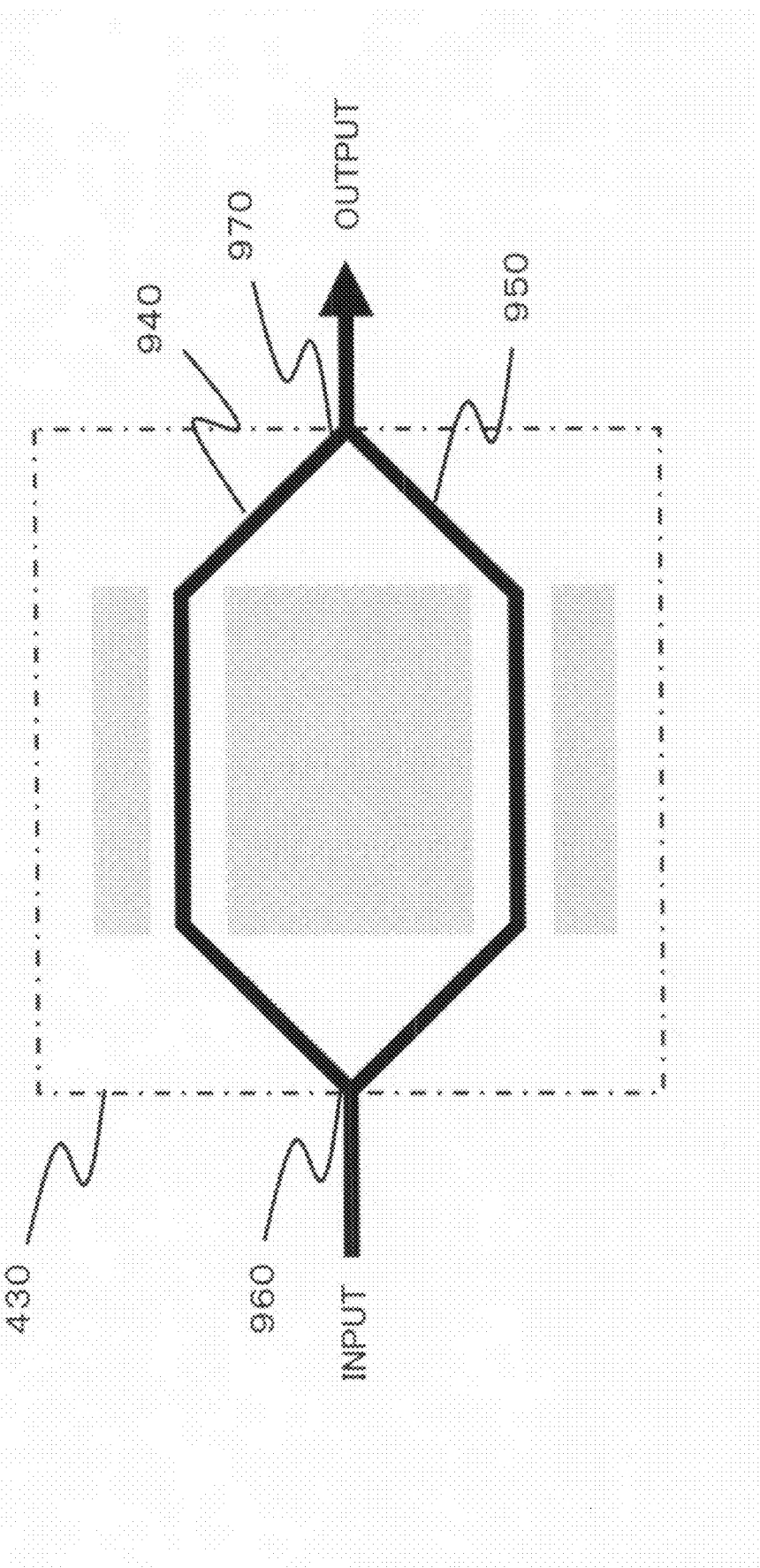
FIG. 19 is a diagram showing a configuration of the MZ interferometer 430 capable of an SSB optical modulation.
Figure 20:
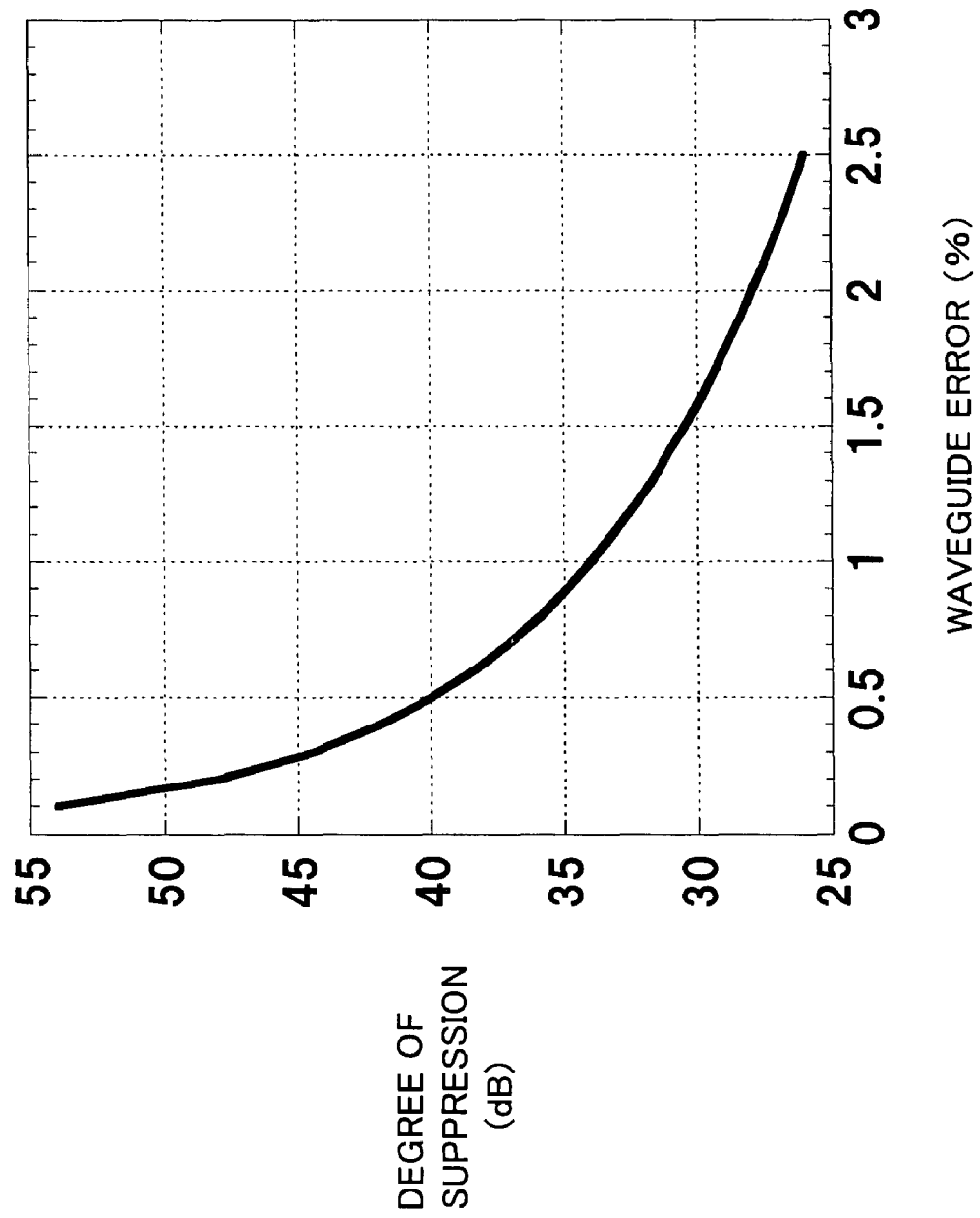
FIG. 20 is a diagram showing the relationship between the optical waveguide manufacturing error and the degree by which the unnecessary sideband component is suppressed.

FIG. 13B is a block diagram showing a configuration of a characteristics evaluator according to a fifth embodiment of the present invention. A characteristics evaluator 140 of the fifth embodiment is for evaluating the characteristics of an SSB optical modulation section 85. The SSB optical modulation section 85 is the same as those described above in the first to fourth embodiments. Referring to FIG. 13B, the characteristics evaluator 140 includes the optical intensity detecting section 40 and the control section 50. The elements included in the characteristics evaluator 140 are the same as those of the first to fourth embodiments described above, and will not be further described below. Thus, by using a method similar to those of the first to fourth embodiments described above, the characteristics evaluator 140 measures the intensity of light outputted from the SSB optical modulation section 85, and obtains the optical intensity maximum value Pmax and the optical intensity minimum value Pmin, which determine the extinction ratio of the SSB optical modulation section 85, to thereby drive the ratio between the desired optical component and the undesired optical component from the SSB optical intensity modulation section 85 based on the optical intensity maximum value Pmax and the optical intensity minimum value Pmin. Thus, the characteristics evaluator 140 can evaluate the characteristics of the SSB optical modulation section 85. The characteristics evaluator 140 may also have a function of making variable the wavelength of the optical signal inputted to the SSB optical modulation section 85 so that the characteristics of the SSB optical modulation section 85 can be evaluated with a greater variety of conditions, or a function of making variable the power of the optical signal inputted to the SSB optical modulation section 85.

Sixth Embodiment

FIG. 13C is a block diagram showing a configuration of a compensator according to a sixth embodiment of the present invention. A compensator 150 of the sixth embodiment has a configuration similar to those of the optical transmission devices of the first to fourth embodiments, excluding the SSB optical modulation section, and compensates for the characteristics of the SSB optical modulation section. Referring to FIG. 13C, the compensator 150 includes the light source 10, the light branching section 30, the optical intensity detecting section 40, the control section 50, the signal generating section 60, the electric signal branching section 61, the amplitude adjusting section 62, the phase adjustment section 63, the first DC power supply 71, and the second DC power supply 72. The elements included in the compensator 150 are the same as those of the first to fourth embodiments described above, and will not be further described below. Moreover, the SSB optical modulation section 85 is the same as those of the first to fourth embodiments. Thus, by using a method similar to those of the first to fourth embodiments described above, the compensator 150 compensates for the characteristics of the SSB optical modulation section 85. While the SSB optical modulation section 85 may be accompanied by the light source 10, the first DC power supply 71 and the second DC power supply 72 in some cases, the compensator 150 does not need to include the light source 10, the first DC power supply 71 and the second DC power supply 72 in such cases.

The present invention is useful as an optical transmission device, or the like, capable of compensating for the deterioration in the operation characteristics of an optical modulation section due to a manufacturing error, or the like, in a case where an MZ interferometer inside the optical modulation section for performing a single-sideband modulation, a single-sideband suppressed-optical carrier modulation, or the like, has wavelength dependence and manufacturing errors.

While the invention has been described in detail, the foregoing description is in all aspects illustrative and not restrictive. It is understood that numerous other modifications and variations can be devised without departing from the scope of the invention.

What is claimed is:

1. An optical transmission device, comprising:
   a light source for outputting an optical carrier;
   a signal generating section for outputting an electric signal;
   an electric signal branching section for branching the electric signal outputted from the signal generating section into two electric signals having a predetermined phase difference therebetween;
   an amplitude adjusting section for receiving at least one of the two electric signals outputted from the electric signal branching section and adjusting an amplitude of the received electric signal; and
   an optical modulation section with suppressed sideband component, including an optical waveguide branching into two routes of optical waveguide at an input end and merging together at an output end, for outputting an optical intensity-modulated signal from the output end, wherein:
   if both of the two electric signals are inputted to the amplitude adjusting section, the optical modulation section modulates optical carriers passing through the two routes of optical waveguide with two amplitude-adjusted electric signals inputted via the amplitude adjusting section, and if one of the two electric signals is inputted to the amplitude adjusting section, the optical modulation section modulates optical carriers passing through the two routes of optical waveguide with an amplitude-adjusted electric signal inputted via the amplitude adjusting section and an amplitude-unadjusted electric signal inputted from the electric signal branching section without passing through the amplitude adjusting section; and
   if the optical modulation section cannot evenly branch an intensity of the optical carrier into the two routes of optical waveguide, the amplitude adjusting section adjusts an amplitude of the received electric signal so that an unnecessary sideband component of the optical intensity-modulated signal outputted from the optical modulation section disappears.

2. The optical transmission device according to claim 1, further comprising:
   a light branching section for branching an optical signal outputted from the optical modulation section;
   an optical intensity detecting section for receiving, as a monitoring optical signal, one of the optical signals outputted from the light branching section, and detecting an intensity of the received optical signal; and
   a control section for obtaining an optical intensity maximum value and an optical intensity minimum value, which determine an extinction ratio of the optical modulation section, based on the signal intensity detected by the optical intensity detecting section, and for obtaining amplitudes of the two electric signals or an amplitude ratio therebetween such that the sideband component can be made to disappear based on the optical intensity maximum value and the optical intensity minimum value,
   wherein the amplitude adjusting section adjusts the amplitude of the received electric signal based on the amplitudes or the amplitude ratio obtained by the control section.

3. The optical transmission device according to claim 2, wherein the control section includes a storage section for storing a relationship of the optical intensity maximum value and the optical intensity minimum value with respect to the amplitudes of the two electric signals or the amplitude ratio therebetween.

4. The optical transmission device according to claim 1, wherein a modulation process performed by the optical modulation section is a single-sideband modulation.

5. The optical transmission device according to claim 1, wherein a modulation process performed by the optical modulation section is a single-sideband suppressed-optical carrier modulation.

6. The optical transmission device according to claim 2, wherein the control section performs a control of sweeping only one of DC bias voltages applied to the two routes of optical waveguide in order to obtain the optical intensity maximum value and the optical intensity minimum value.

7. The optical transmission device according to claim 2, wherein the control section performs a control of sweeping only one of DC bias voltages applied to three MZ interferometers forming the optical modulation section in order to obtain the optical intensity maximum value and the optical intensity minimum value, the one of DC bias voltages being a DC bias voltage applied to a latter one of the three MZ interferometers.

8. The optical transmission device according to claim 1, further comprising:
   a first light branching section for branching the optical carrier outputted from the light source;
   a second light branching section for branching an optical signal outputted from the optical modulation section;
   an optical intensity detecting section for receiving, as a monitoring optical carrier, a branch optical carrier outputted from the first light branching section, and detecting an intensity of the received optical carrier, and for receiving, as a monitoring optical signal, a branch optical signal outputted from the second light branching section, and detecting an intensity of the received optical signal; and
   a control section for obtaining an optical intensity minimum value, which is a factor that determines an extinction ratio of the optical modulation section, based on the signal intensity of the monitoring optical signal detected by the second optical intensity detecting section, and obtaining amplitudes of the two electric signals or an amplitude ratio therebetween such that the unnecessary sideband component can be made to disappear based on the optical intensity minimum value and the signal intensity of the monitoring optical carrier detected by the first optical intensity detecting section,
   wherein the amplitude adjusting section adjusts-aft the amplitude of the received electric signal based on the amplitudes or the amplitude ratio obtained by the control section.

9. The optical transmission device according to claim 8, wherein the control section includes a storage section for storing a relationship of the optical intensity minimum value and the signal intensity of the monitoring optical carrier detected by the first optical intensity detecting section with respect to the amplitudes of the two electric signals or the amplitude ratio therebetween.

10. The optical transmission device according to claim 8, wherein a modulation process performed by the optical modulation section is a single-sideband modulation.

11. The optical transmission device according to claim 8, wherein a modulation process performed by the optical modulation section is a single-sideband suppressed-optical carrier modulation.

12. The optical transmission device according to claim 10, wherein the control section performs a control of sweeping only one of DC bias voltages applied to the two routes of optical waveguide of the optical modulation section in order to obtain the optical intensity minimum value.

13. The optical transmission device according to claim 11, wherein the control section performs a control of sweeping only one of DC bias voltages applied to three MZ interferometers forming the optical modulation section in order to obtain the optical intensity minimum value, the one of DC bias voltages being a DC bias voltage applied to a latter one of the three MZ interferometers.

14. The optical transmission device according to claim 1, wherein where an intensity ratio of an optical carrier being branched into the two routes of optical waveguide is $(1-\gamma):\gamma$, the amplitude adjusting section adjusts amplitudes $k_a$ and $k_b$ of the two electric signals so that the optical intensity ratio satisfies the following relationship:

$$(1-\gamma):\gamma = J_1(k_a):J_1(k_b)$$

where $J_1(k_a)$ and $J_1(k_b)$ are each a Bessel function representing an intensity of a first-order sideband component of the optical intensity-modulated signal, $\gamma$ is a result of dividing an optical carrier intensity of an optical waveguide to which an electric signal adjusted to an amplitude corresponding to $k_a$ is applied by a sum of the optical carrier intensity of the optical waveguide to which the electric signal adjusted to the amplitude corresponding to $k_a$ is applied and an optical carrier intensity of an optical waveguide to which an electric signal adjusted to an amplitude corresponding to $k_b$ is applied.

15. The optical transmission device according to claim 1, wherein the amplitude adjusting section adjusts the amplitude of the received electric signal so that an intensity of a difference beat signal between a sideband component that is necessary for transmitting information and the unnecessary sideband component does not exceed a reference intensity.

16. A characteristics evaluator for evaluating characteristics of an optical modulation section, wherein the optical modulation section branches an optical carrier into two routes of optical waveguide, varies a phase of each of the optical carriers branched into two routes with a high-frequency signal, and combines together the two routes of optical carrier whose phases are varied to thereby generate an optical intensity-modulated signal,
   wherein the characteristics evaluator measures an optical intensity outputted from the optical modulation section, and obtains an optical intensity maximum value and an optical intensity minimum value, which determine an extinction ratio of the optical modulation section, based on the measured optical intensity, to thereby derive a ratio between a desired optical component and an undesired optical component outputted from the optical modulation section, based on the optical intensity maximum value and the optical intensity minimum value,
   wherein a modulation process performed by the optical modulation section is a single-sideband suppressed-optical carrier modulation, and
   wherein the characteristics evaluator performs a control of sweeping only one of DC bias voltages applied to three MZ interferometers forming the optical modulation section in order to obtain the optical intensity maximum value and the optical intensity minimum value, the one of DC bias voltages being a DC bias voltage applied to a latter one of the three MZ interferometers.

17. A compensator for compensating for characteristics of an optical modulation section, wherein the optical modulation section branches an optical carrier into two routes of optical waveguide, varies a phase of each of the optical carriers branched into two routes with a high-frequency signal, and combines together the two routes of optical carrier whose phases are varied to thereby generate an optical intensity-modulated signal, the compensator comprising:
- a signal generating section for outputting an electric signal;
- an electric signal branching section for branching the electric signal outputted from the signal generating section into two electric signals having a predetermined phase difference therebetween; and
- an amplitude adjusting section for receiving at least one of the two electric signals outputted from the electric signal branching section and adjusting an amplitude of the received electric signal,
- wherein where the optical modulation section cannot evenly branch an intensity of the optical carrier into the two routes of optical waveguide, the amplitude adjusting section adjusts an amplitude of the received electric signal so that an unnecessary sideband component of the optical intensity-modulated signal outputted from the optical modulation section disappears.

18. The compensator according to claim 17, further comprising:
- a light branching section for branching an optical signal outputted from the optical modulation section;
- an optical intensity detecting section for receiving, as a monitoring optical signal, one of the optical signals outputted from the light branching section, and detecting an intensity of the received optical signal; and
- a control section for obtaining an optical intensity maximum value and an optical intensity minimum value, which determine an extinction ratio of the optical modulation section, based on the signal intensity detected by the optical intensity detecting section, and for obtaining amplitudes of the two electric signals or an amplitude ratio therebetween such that the unnecessary sideband component can be made to disappear based on the optical intensity maximum value and the optical intensity minimum value,
- wherein the amplitude adjusting section adjusts an amplitude of the received electric signal based on the amplitudes or the amplitude ratio obtained by the control section.

19. The compensator according to claim 18, wherein the control section includes a storage section for storing a relationship of the optical intensity maximum value and the optical intensity minimum value with respect to the amplitudes of the two electric signals or the amplitude ratio therebetween.

* * * * *